US011215390B2

(12) United States Patent
Yokoe et al.

(10) Patent No.: US 11,215,390 B2
(45) Date of Patent: Jan. 4, 2022

(54) DRIVE DEVICE WITH ABNORMALITY DETECTION MECHANISM AND DAMPER DEVICE

(71) Applicant: NIDEC SANKYO CORPORATION, Nagano (JP)

(72) Inventors: Satoru Yokoe, Nagano (JP); Takehiko Yazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 153 days.

(21) Appl. No.: 16/352,081

(22) Filed: Mar. 13, 2019

(65) Prior Publication Data

US 2019/0293337 A1  Sep. 26, 2019

(30) Foreign Application Priority Data

Mar. 22, 2018  (JP) .............................. JP2018-053996

(51) Int. Cl.
| | |
|---|---|
| *F25D 17/04* | (2006.01) |
| *H02K 7/116* | (2006.01) |
| *F16K 31/04* | (2006.01) |
| *B60H 1/00* | (2006.01) |
| *H02K 11/00* | (2016.01) |
| *H02H 7/085* | (2006.01) |
| *F16K 1/20* | (2006.01) |

(52) U.S. Cl.
CPC ......... *F25D 17/045* (2013.01); *H02H 7/0856* (2013.01); *H02K 7/116* (2013.01); *H02K 11/0094* (2013.01); *B60H 1/00857* (2013.01); *F16K 1/2007* (2013.01); *F16K 31/043* (2013.01)

(58) Field of Classification Search
CPC .... F16K 31/524; F16K 31/043; F16K 1/2007; F16H 31/004; F16H 2061/2869; F16H 29/12; F01L 1/255; F01L 13/085; F16D 2125/38; F16D 2125/46; F05B 2270/1097; F05D 2260/607; F25D 17/045
USPC .......................................... 454/333; 251/262
See application file for complete search history.

(56) References Cited

U.S. PATENT DOCUMENTS

| | | | | | |
|---|---|---|---|---|---|
| 4,411,348 | A | * | 10/1983 | Fillion | ..................... E06B 9/88 192/139 |
| 4,506,829 | A | * | 3/1985 | Grant | ..................... F24F 13/15 137/601.09 |
| 8,545,297 | B2 | | 10/2013 | Spiessl et al. | |
| 2006/0151736 | A1 | * | 7/2006 | Marcoux | ............ B60H 1/00857 251/301 |

(Continued)

*Primary Examiner* — Edelmira Bosques
*Assistant Examiner* — Andrew W Cheung
(74) *Attorney, Agent, or Firm* — Cantor Colburn LLP

(57) ABSTRACT

A drive device with an abnormality detection mechanism may include a drive source; a drive member to which power of the drive source is transmitted; a driven member operably coupled to the drive member; and a detector structured to output a signal in response to the driven member being turned in the second direction around the second axial line. The driven member may be structured such that, in response to the drive member being turned in a first direction around a first axial line, the driven member is turned in a first direction around a second axial line; and, in response to transmission of the power from the drive member being disconnected, the driven member is turned in a second direction around the second axial line.

11 Claims, 15 Drawing Sheets

(56) References Cited

U.S. PATENT DOCUMENTS

2014/0005896 A1\* 1/2014 Hirota ............... B60K 11/085
781/49

\* cited by examiner

DRIVE DEVICE WITH ABNORMALITY DETECTION MECHANISM AND DAMPER DEVICE

CROSS REFERENCE TO RELATED APPLICATION

The present invention claims priority under 35 U.S.C. § 119 to Japanese Application No. 2018-053996 filed Mar. 22, 2018, the entire content of which is incorporated herein by reference.

TECHNICAL FIELD

At least an embodiment of the present invention may relate to a drive device with an abnormality detection mechanism capable of detecting occurrence of an abnormality in turning of a driven member and to a damper device.

BACKGROUND

In a damper device controlling a flow of cold air in a refrigerator or the like, a drive device is used which includes a drive source, a drive member to which power of the drive source is transmitted, and a driven member to which, when the drive member is turned to one side around a first axial line, power of the drive member is transmitted and turned to one side around a second axial line. The driven member is turned to the other side around the second axial line by an urging force of a spring in a state that transmission of power of the drive member is disconnected. Therefore, when the driven member itself is structured as a baffle or, when the driven member and a baffle are structured to be turned together, a cold air passage can be opened and closed by the baffle (see U.S. Pat. No. 8,545,297 (Patent Literature 1)).

In the structure described in Patent Literature 1, the drive member is turned around the first axial line while the driven member is turned to the other side around the second axial line. More specifically, also while the driven member is turned in a closing direction around the second axial line, the drive member is turned to the one side around the first axial line as usual. Therefore, when the driven member is to be turned to a closing side around the second axial line, even if the driven member becomes unable to be turned in the closing direction due to occurrence of malfunction, for example, a foreign matter is caught, the drive member is turned to the one side around the first axial line. Therefore, even when it is structured that a rotational position of the drive member is always detected through a switch lever, it is unable to detect that the driven member becomes unable to turn to the closing side around the second axial line. Accordingly, even after the driven member has become unable to be turned to the closing side around the second axial line, the drive member drives the driven member to an open side or the closing side around the second axial line as usual and thus, it becomes difficult to perform temperature control.

SUMMARY

In view of the problem described above, at least an embodiment of the present invention may advantageously provide a drive device with an abnormality detection mechanism capable of detecting that, when a driven member is turned in a state that transmission of power of a drive member is disconnected, the driven member is unable to be turned, and provide a damper device.

According to at least an embodiment of the present invention, there may be provided a drive device with an abnormality detection mechanism including a drive source, a drive member to which power of the drive source is transmitted, a driven member which is, when the drive member is turned to one side around a first axial line, transmitted with the power through the drive member and turned to one side around a second axial line and, in a state that transmission of the power from the drive member is disconnected, the driven member being turned to the other side around the second axial line, and a detector which outputs a signal when the driven member is turned to the other side around the second axial line, wherein the signal outputted in a normal state that the driven member is normally turned is different from the signal outputted in an abnormal state that turning of the driven member is prevented.

According to at least an embodiment of the present invention, in a case that the driven member is turned in a state that transmission of power of the drive member is disconnected, when an abnormality that the driven member is unable to be turned is occurred, the detector outputs a signal different from a normal state and thus it can be detected that the driven member is unable to be turned.

In at least an embodiment of the present invention, it may be structured that the detector outputs a first signal corresponding to an angular position of the drive member when the drive member drives the driven member to the one side around the second axial line, the detector outputs a second signal corresponding to an angular position of the drive member in the normal state, the detector outputs a third signal in the abnormal state, and the first signal, the second signal and the third signal are respectively different from each other. According to this structure, detection of an angular position of the drive member and detection of occurrence of an abnormality can be performed by the common detector.

In at least an embodiment of the present invention, it may be structured that the drive device with an abnormality detection mechanism includes a transmission member which is turnable around a third axial line in cooperation with turning of the drive member around the first axial line, and the detector outputs the first signal, the second signal and the third signal corresponding to a position of the transmission member.

In at least an embodiment of the present invention, it may be structured that the drive member includes a position detection cam face which turns the transmission member around the third axial line, and the transmission member is urged in a direction coming close to the detector by a first urging member.

In at least an embodiment of the present invention, it may be structured that, in the normal state, the driven member makes the transmission member temporarily displace in a middle of turning to the other side around the second axial line and thereby the detector outputs a signal temporarily changing an output of the detector as the second signal and, in the abnormal state, the transmission member is not displaced and thus a signal in which the output of the detector is not changed is outputted from the detector as the third signal.

In at least an embodiment of the present invention, it may be structured that the driven member includes an abutting part structured to contact with the transmission member in the normal state and displace the transmission member.

In at least an embodiment of the present invention, it may be structured that the abutting part temporarily pushes away the transmission member to the other side around the third axial line and then the abutting part is turned to the other side around the second axial line in the normal state. According to this structure, the transmission member can be set in largely different postures from each other in the normal state and the abnormal state.

In at least an embodiment of the present invention, it may be structured that at least one of the abutting part and the transmission member is capable of being displaced by a reaction force occurred when the transmission member and the abutting part are abutted with each other. According to this structure, in a case that the transmission member is to be temporarily pushed away to the other side around the third axial line in the normal state, a force when the abutting part and the transmission member are abutted with each other can be released, and the abutting part is capable of temporarily pushing away the transmission member to the other side around the third axial line in the normal state and the abutting part is smoothly turned to the other side around the second axial line.

In at least an embodiment of the present invention, it may be structured that the transmission member includes a first arm part structured to contact with the position detection cam face and a second arm part structured to abut with the abutting part in the normal state.

In at least an embodiment of the present invention, it may be structured that the abutting part is structured separately from a main body part of the driven member and is held by the main body part.

In at least an embodiment of the present invention, it may be structured that the abutting part is integrally structured in the driven member.

In at least an embodiment of the present invention, it may be structured that the detector is a pushing type switch.

In at least an embodiment of the present invention, it may be structured that the drive device with an abnormality detection mechanism includes a second urging member which urges the driven member to the other side around the second axial line when the driven member is turned to the other side around the second axial line. According to this structure, the driven member can be turned to the other side around the second axial line with a comparatively simple structure.

In at least an embodiment of the present invention, it may be structured that the drive source is a motor which rotates the drive member only to one side around the first axial line.

A damper device comprising the drive device with an abnormality detection mechanism in at least an embodiment of the present invention includes a baffle which is turnable around the second axial line together with the driven member and a frame provided with an opening part which is opened and closed by the baffle.

In at least an embodiment of the present invention, it may be structured that the abnormal state is occurred due to that, when the opening part is to be closed by the baffle, a foreign matter is caught between the baffle and the frame and thereby turnings of the baffle and the driven member are prevented.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A geared motor including a switch mechanism and a damper device for a refrigerator to which at least an embodiment of the present invention is applied will be described below with reference to the accompanying drawings. A damper device in accordance with at least an embodiment of the present invention is not limited to a damper for a refrigerator and may be used in various devices in which an intake port for a fluid is opened and closed to adjust its flow amount.

(Entire Structure)

Figure 1:
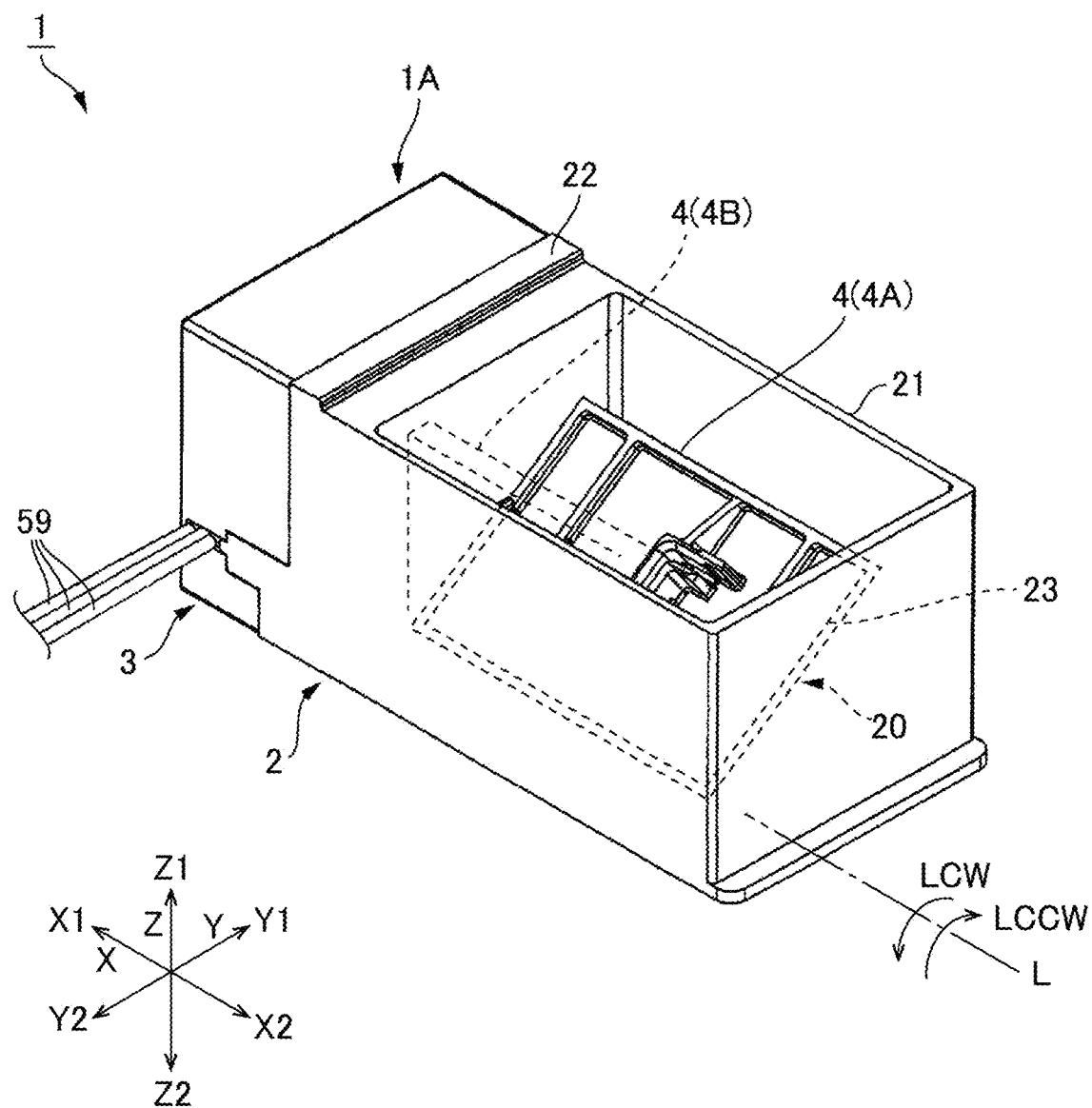
FIG. 1 is a perspective view showing a damper device in accordance with at least an embodiment of the present invention.
Figure 2:
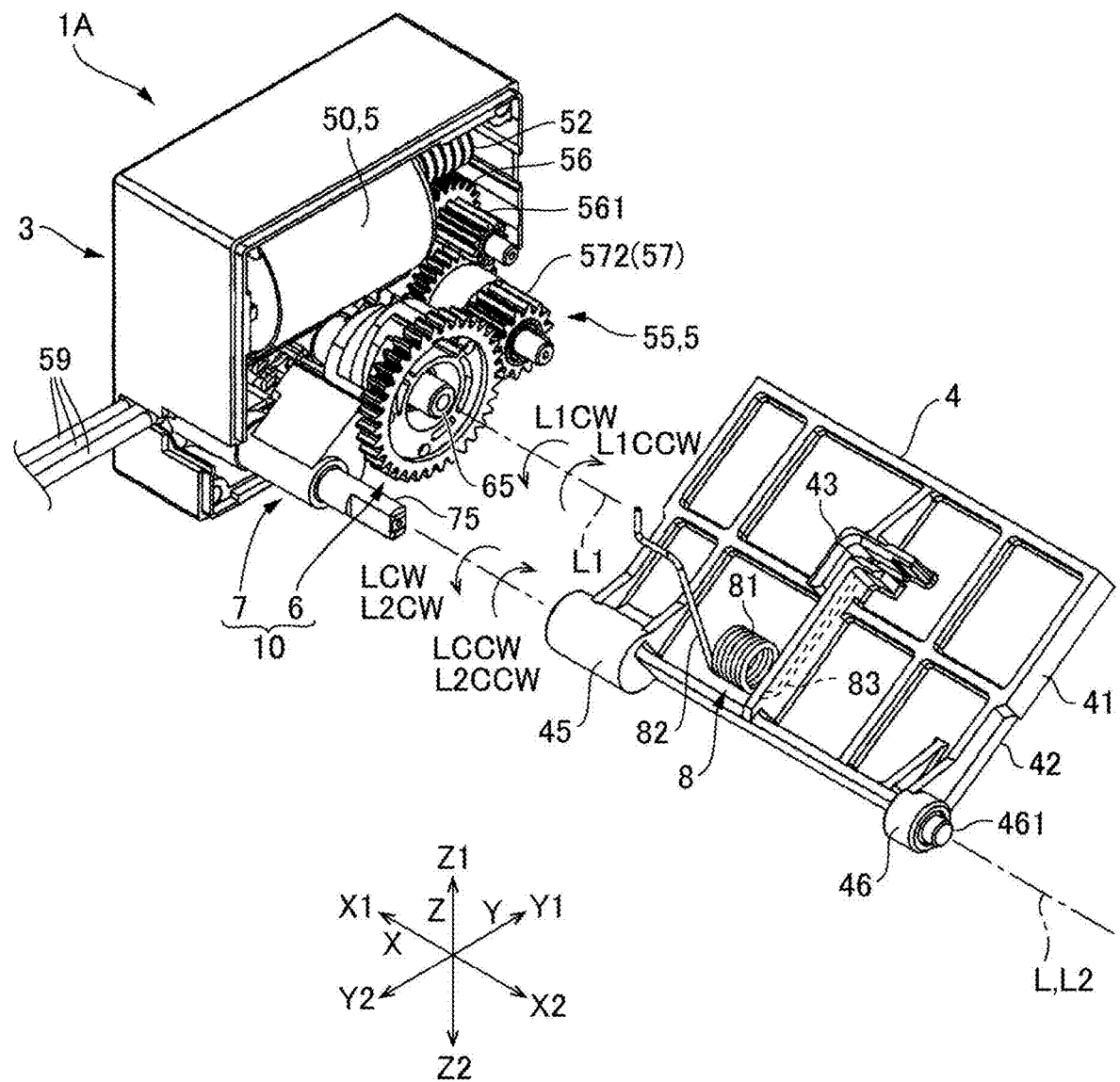
FIG. 2 is an exploded perspective view showing a damper device in which a frame shown in FIG. 1 is not shown.

FIG. 1 is a perspective view showing a damper device 1 in accordance with at least an embodiment of the present invention. FIG. 2 is an exploded perspective view showing the damper device 1 in which a frame 2 is not shown. In the present specification, the reference sign "L" is a turning center axial line of a baffle 4. The first axial line "L1" is a rotation center axial line of a drive wheel 6 of a baffle drive mechanism 5 structured to drive the baffle 4, and the second axial line "L2" is a turning center axial line of a driven wheel 7. Further, a direction along the turning center axial line "L" is referred to as an "X" direction, a direction intersecting the turning center axial line "L" (direction in which cold air flows) is referred to as a "Z" direction, and a direction intersecting the "X" direction and the "Z" direction is referred to as a "Y" direction. Further, one side in the "X" direction is referred to as an "X1", the other side in the "X" direction is referred to as an "X2", one side in the "Y" direction is as a "Y1", the other side in the "Y" direction is as a "Y2", one side in the "Z" direction is as a "Z1", and the other side in the "Z" direction is as a "Z2".

As shown in FIG. 1 and FIG. 2, the damper device 1 is formed in a rectangular parallelepiped shape which is long in the "X" direction as a whole. The damper device 1 includes a frame 2 in which a rectangular opening part 20 is formed, a baffle 4 for opening and closing the opening part 20, and a baffle drive mechanism 5 structured to drive the baffle 4. A cover 3 which is a case accommodating the baffle drive mechanism 5 is attached to one end side in a longitudinal direction ("X" direction) of the frame 2. The frame 2 and the cover 3 are made of resin. The frame 2 is provided with a tube part 21 having a rectangular cross section which is opened to both sides in the "Z" direction. The frame 2 is integrally formed with a partition 22 which separates an inside of the tube part 21 from a space where the baffle drive mechanism 5 is disposed on one side ("X1" direction side) in the longitudinal direction of the tube part 21. The cover 3 is engaged with the frame 2 by a hook mechanism not shown.

A frame-shaped seal part 23 is formed in the inside of the tube part 21 so as to be obliquely inclined with respect to the "Z" direction and the "Y" direction. An inner side of the seal part 23 is formed to be the opening part 20. The baffle 4 is turnably supported by the frame 2 around the turning center axial line "L" extended in the "X" direction on the inner side of the tube part 21. In a state shown in FIG. 1, the baffle 4 is abutted with the seal part 23 and is set in a closing posture 4A that the opening part 20 is closed by the baffle 4. When the baffle drive mechanism 5 drives and turns the baffle 4 to one side "LCW" around the turning center axial line "L" from this state to separate the baffle 4 from the seal part 23, the baffle 4 is set to an open posture 4B in which the opening part 20 is opened.

The baffle 4 includes an opening/closing plate 41 whose size is larger than the opening part 20 and a sheet-shaped elastic member 42 (see FIG. 2) made of foamed polyurethane or the like which is stuck on a face on the opening part 20 side of the opening/closing plate 41. The elastic member 42 is abutted with a periphery (seal part 23) of the opening part 20 to close the opening part 20. Cold air is flowed from an opposite side (the other side "Z2" in the "Z" direction) to the side where the baffle 4 is disposed (one side "Z1" in the "Z" direction) with respect to the opening part 20 to one side "Z1" in the "Z" direction through the opening part 20. Alternatively, cold air may be flowed from the side where the baffle 4 is disposed (one side "Z1" in the "Z" direction) with respect to the opening part 20 to the other side "Z2" in the "Z" direction through the opening part 20.

(Baffle Drive Mechanism)

Figure 3:
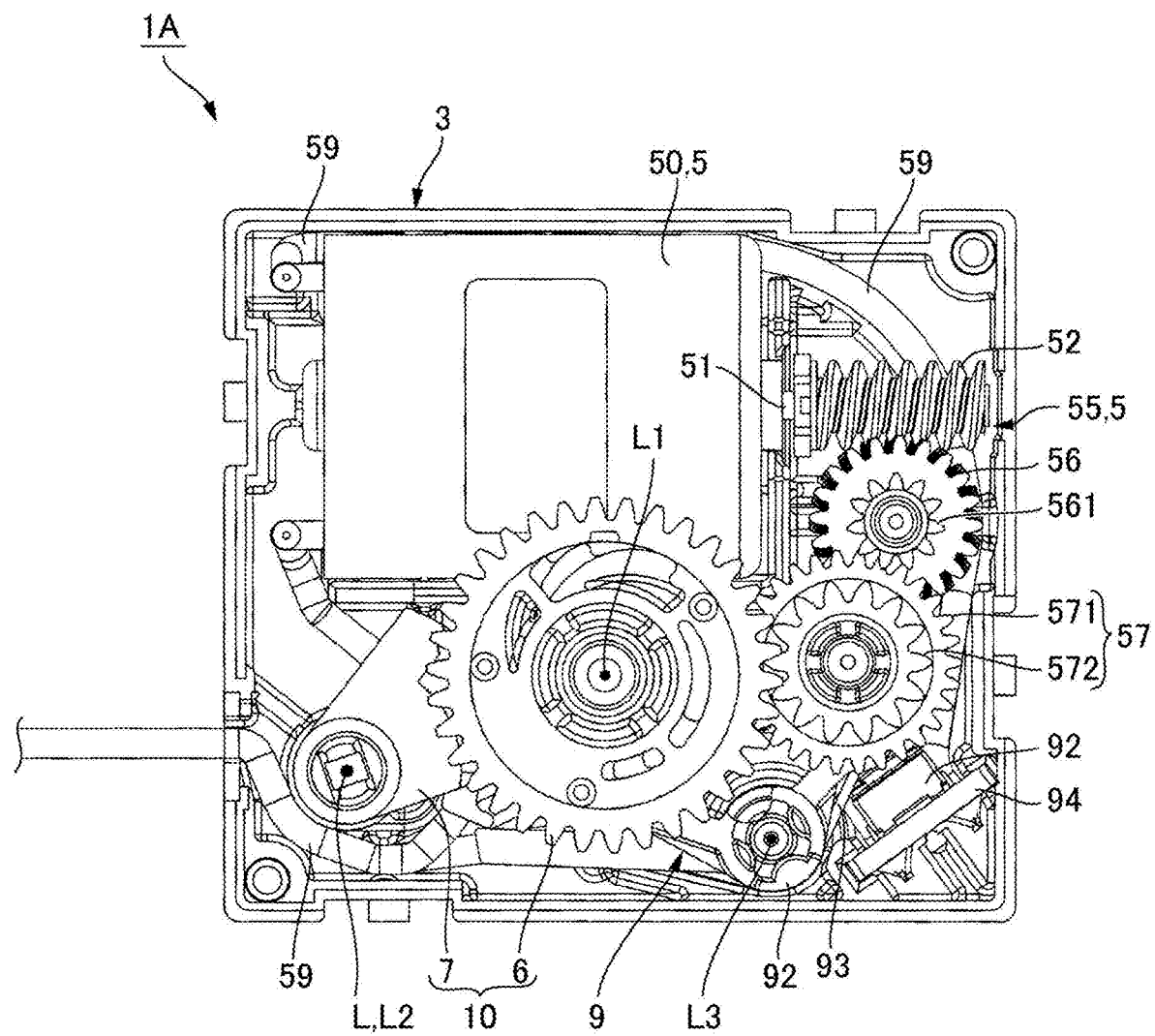
FIG. 3 is a plan view showing a baffle drive mechanism and the like in FIG. 2.

FIG. 3 is a plan view showing the baffle drive mechanism 5 and the like in FIG. 2. As shown in FIG. 2 and FIG. 3, the baffle drive mechanism 5 includes a motor 50 and a transmission mechanism 55 structured to transmit rotation of the motor 50 to the baffle 4. The damper device 1 includes a drive device 1A structured to turn the baffle 4, and the drive device 1A accommodates the baffle drive mechanism 5 between the cover 3 and the frame 2 and is structured so as to be connected with a lead wire 59. The transmission mechanism 55 includes a worm gear 52 formed on an output shaft 51 of the motor 50, a worm wheel 56 meshed with the worm gear 52, a composite gear 57 provided with a large diameter gear 571 which is meshed with a small diameter gear 561 formed in the worm wheel 56, and a rotation transmission mechanism 10 to which rotation of the composite gear 57 is transmitted through a small diameter gear 572 of the composite gear 57. Rotation of the rotation transmission mechanism 10 is transmitted to the baffle 4.

Various motors may be used as the motor 50. In this embodiment, a DC motor is used as the motor 50 and thus its control is easy. The motor 50 outputs rotation in only one direction around the motor axial line. In this embodiment, the motor 50 rotates only in a direction for turning the baffle 4 to one side "LCW" (open direction) around the turning center axial line "L". In other words, the motor 50 outputs only a rotation drive force for driving a drive wheel 6 described below to one side "L1CCW" around the first axial line "L1".

(Rotation Transmission Mechanism)

Figure 4:
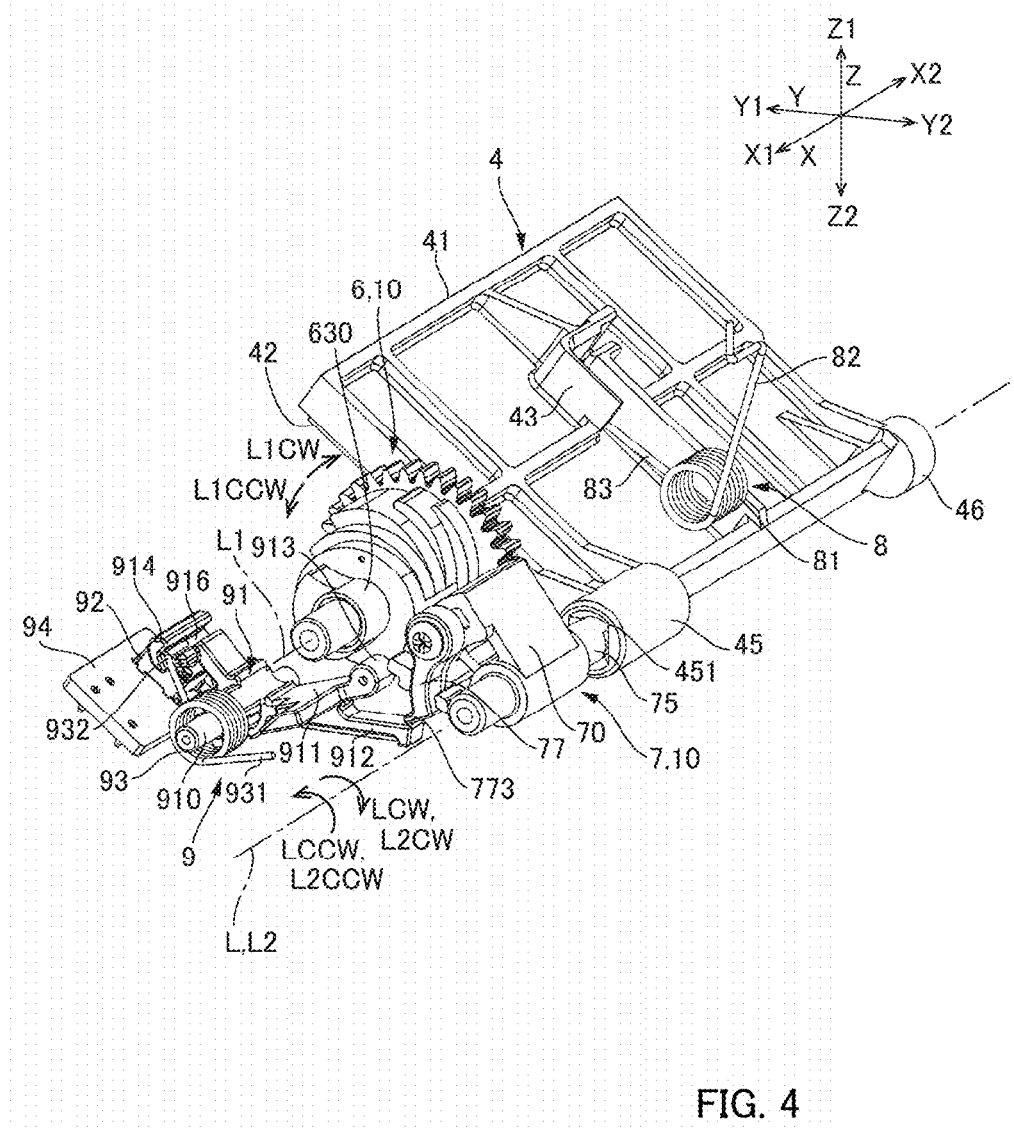
FIG. 4 is a perspective view showing a rotation transmission mechanism and the like in FIG. 2.

FIG. 4 is a perspective view showing the rotation transmission mechanism 10 and the like in FIG. 2. As shown in FIG. 2, FIG. 3 and FIG. 4, the rotation transmission mechanism 10 includes a drive wheel 6 which is rotated to one side "L1CCW" around the first axial line "L1" extended in the "X" direction in parallel to the turning center axial line "L" of the baffle 4, a driven wheel 7 which is driven and turned by the drive wheel 6 to one side "L2CW" around the second axial line "L2" parallel to the first axial line "L1", and a torsion coil spring 8 that is an urging member which urges the driven wheel 7 to the other side "L2CCW" around the second axial line "L2". Further, the rotation transmission mechanism 10 includes a detector 92 structured to monitor an angular position of the drive wheel 6 or the driven wheel 7 (baffle 4).

In this embodiment, the driven wheel 7 is connected with the baffle 4. Therefore, the turning center axial line (second axial line "L2") of the driven wheel 7 is coincided with the turning center axial line "L" of the baffle 4. In the rotation transmission mechanism 10, when the drive wheel 6 is turned to one side "L1CCW" around the first axial line "L1", the driven wheel 7 is turned to one side "L2CW" around the second axial line "L2" and the baffle 4 is turned to one side "LCW" around the turning center axial line "L" and thus the baffle 4 is set in the open posture 4B. On the other hand, even in a case that the drive wheel 6 is turned to one side "L1CCW" around the first axial line "L1", when turning of the driven wheel 7 by the drive wheel 6 is stopped, the driven wheel 7 is turned to the other side "L2CCW" around the second axial line "L2" by the urging force of the torsion coil spring 8. Therefore, the baffle 4 is turned to the other side "LCCW" around the turning center axial line "L" to be set in the closing posture 4A, and further turning of the baffle 4 to the other side "LCCW" around the turning center axial line "L" is prevented by a stopper (not shown) or the like provided in the frame 2.

As shown in FIG. 1 and FIG. 2, the torsion coil spring 8 is disposed between the baffle 4 and the frame 2. The torsion coil spring 8 is provided with a coil part 81 and end parts 82 and 83 in a straight line shape which are extended in different directions from both ends in an axial line direction of the coil part 81. One end part 82 of the torsion coil spring 8 is held by an engaging part (not shown) provided on an inner face of the tube part 21, and the other end part 83 is held by an engaging part 43 which is provided on a rear face side (opposite side to the elastic member 42) of the opening/closing plate 41 of the baffle 4. The torsion coil spring 8 urges the baffle 4 to the other side "LCCW" (closing direction) around the turning center axial line "L" and thereby the driven wheel 7 is urged to the other side "L2CCW" around the second axial line "L2".

As shown in FIG. 2 and FIG. 4, the driven wheel 7 is provided with a shaft part 75 for connecting with the baffle 4. The shaft part 75 is protruded to an inner side of the tube part 21 through a penetration part which penetrates through the partition 22 of the frame 2 and is connected with the baffle 4. Shaft parts 45 and 46 are formed at both ends in the turning center axial line "L" direction of the baffle 4 at an edge on the turning center axial line "L" side of the baffle 4. The shaft part 75 is fitted to a fitting recessed part 451 (see FIG. 4) which is formed in the shaft part 45. A protruded part 461 in a columnar shape (see FIG. 2) is formed at a tip end of the shaft part 46. The protruded part 461 is turnably held by a holding hole (not shown) which is formed in the tube part 21 of the frame 2.

(Structure of Rotation Transmission Mechanism 10)

Figure 5:
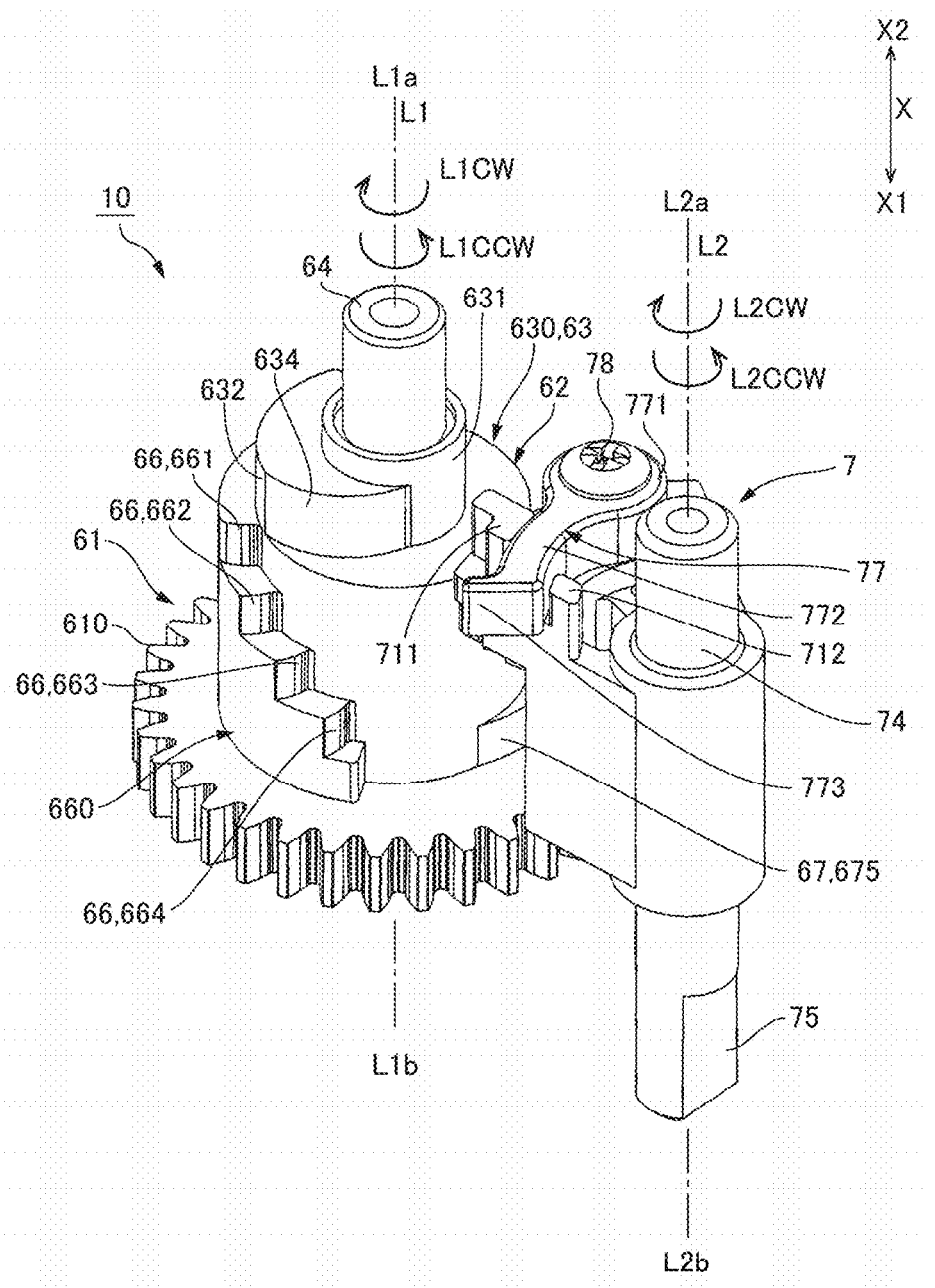
FIG. 5 is a perspective view showing a drive wheel and a driven wheel shown in FIG. 4 which are viewed from a side of a drive tooth forming part.
Figure 6:
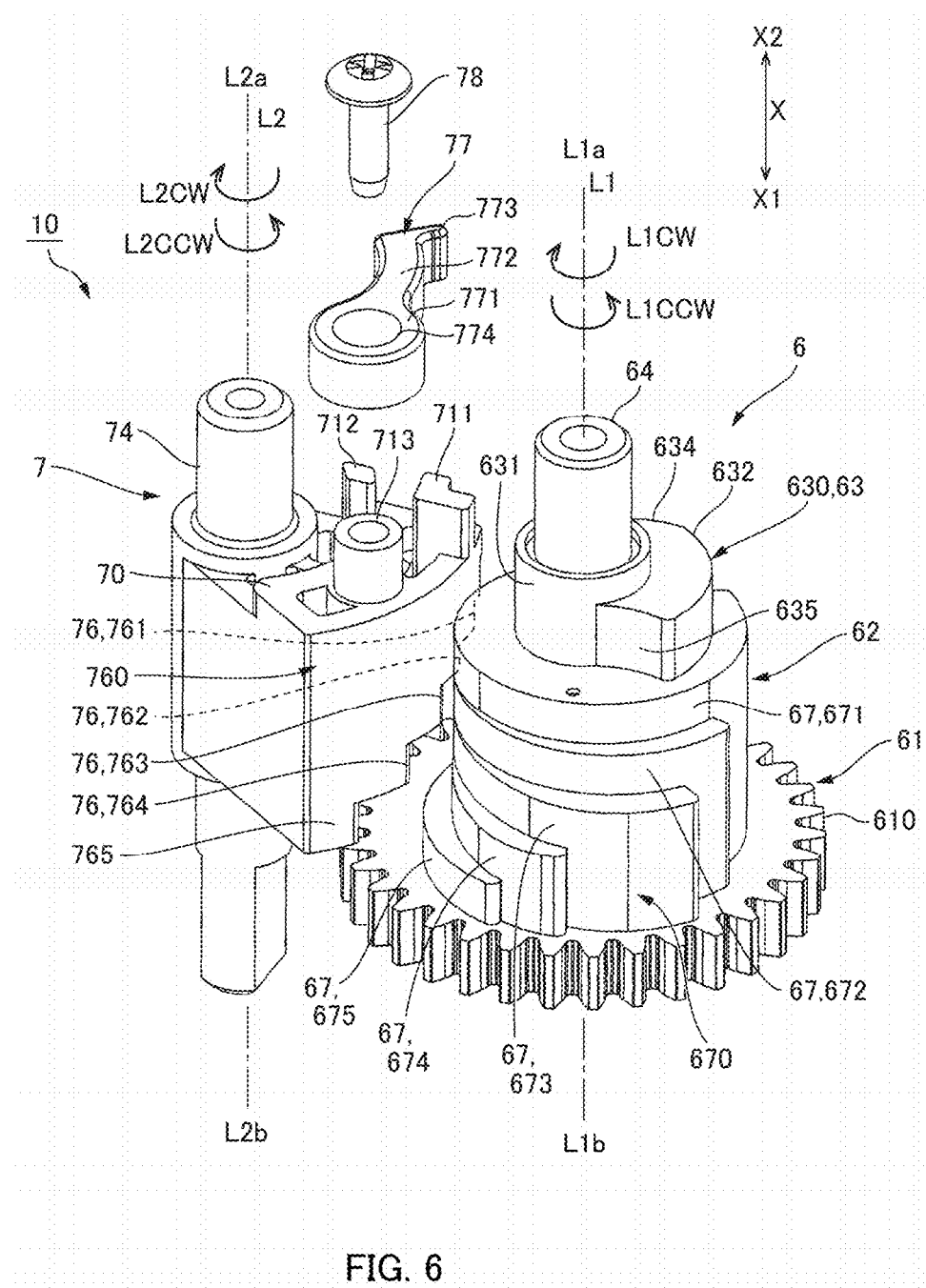
FIG. 6 is a perspective view showing the drive wheel and the driven wheel shown in FIG. 4 which are viewed from a side of a cam face forming part.
Figure 7A:
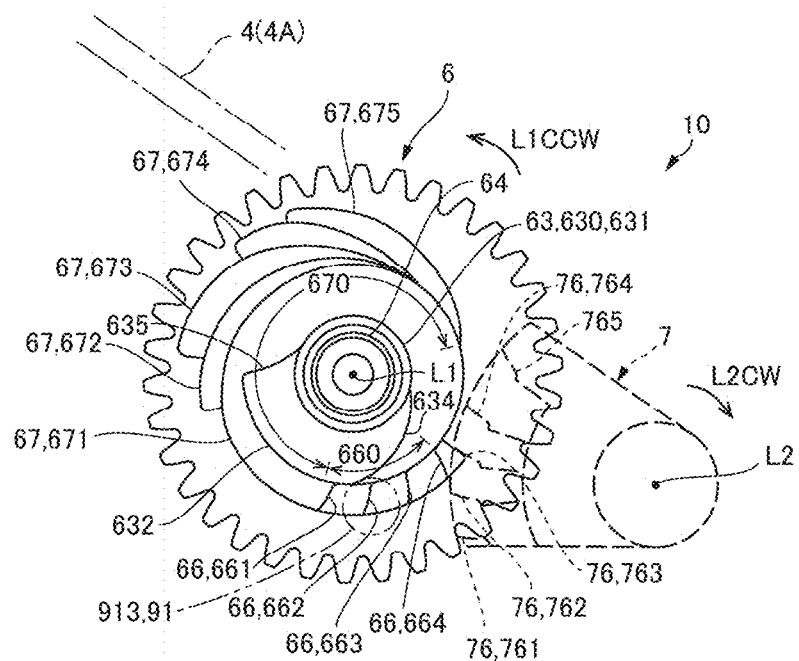
FIG. 7A and FIG. 7B are explanatory views showing a planar structure of the drive wheel and the driven wheel shown in FIG. 4.
Figure 7B:
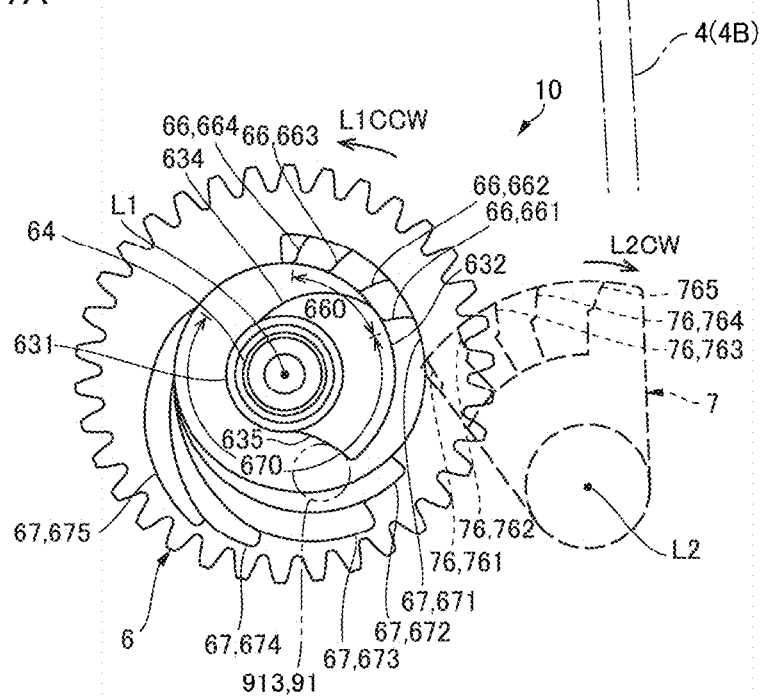

FIG. 5 is a perspective view showing the drive wheel 6 and the driven wheel 7 which are viewed from a side of a drive tooth forming part 660. FIG. 6 is a perspective view showing the drive wheel 6 and the driven wheel 7 in FIG. 4 which are viewed from a side of a cam face forming part 670. FIG. 7A and FIG. 7B are explanatory views showing a planar structure of the drive wheel 6 and the driven wheel 7 shown in FIG. 4. FIG. 7A shows a state that the baffle 4 is set in the closing posture 4A and FIG. 7B shows a state that the baffle 4 is set in the open posture 4B.

As shown in FIG. 5 and FIG. 6, the drive wheel 6 is provided with a circular plate part 61 whose outer peripheral face is formed with a gear 610, a first body part 62 in a columnar shape which is protruded from the center of the circular plate part 61 to one side "L1a" in the first axial line "L1" direction, a second body part 63 in a columnar shape which is protruded from the center of the first body part 62 to one side "L1a" in the first axial line "L1" direction, and a shaft part 64 in a columnar shape which is protruded from the center of the second body part 63 to one side "L1a" in the first axial line "L1" direction. Further, the drive wheel 6 is provided with a shaft part 65 (see FIG. 2 and FIG. 3) which is protruded from the center of the circular plate part 61 to the other side "L1b" in the first axial line "L1" direction. The shaft parts 64 and 65 are rotatably supported by the partition 22 of the frame 2. As shown in FIG. 2 and FIG. 3, the gear 610 formed in the drive wheel 6 is meshed with the small diameter gear 572 of the composite gear 57.

The drive wheel 6 is provided with the drive tooth forming part 660 where a plurality of drive teeth 66 structured to drive and turn the driven wheel 7 to one side "L2CW" around the second axial line "L2" is disposed in a circumferential direction, and the cam face forming part 670 on which the driven wheel 7 is slid when the driven wheel 7 is turned to the other side "L2CCW" around the second axial line "L2" by the urging force of the torsion coil spring 8. The drive tooth forming part 660 and the cam face forming part 670 are provided so as to be adjacent to each other in the circumferential direction.

On the other hand, the driven wheel 7 is provided with a driven tooth forming part 760 where a plurality of driven teeth 76 with which the drive teeth 66 are abutted in order when the drive wheel 6 is turned to one side "L1CCW" around the first axial line "L1" is disposed in the circumferential direction. In this embodiment, the driven wheel 7 is a sector gear and the driven tooth forming part 760 is structured by using its outer peripheral face. In the driven wheel 7, a shaft part 74 protruded to one side "L2a" in the second axial line "L2" direction and a shaft part 75 protruded to the other side "L2b" in the second axial line "L2" direction are formed at a center of the fan shape, and the shaft parts 74 and 75 are turnably supported by the partition 22 of the frame 2.

In the drive wheel 6, a plurality of the drive teeth 66 is disposed at different positions in the first axial line "L1" direction and is formed in a multi-stage manner along the first axial line "L1" direction. A plurality of the driven teeth 76 is provided at different positions in the second axial line "L2" direction so as to correspond to the structure of the drive wheel 6, and the driven teeth 76 are formed in a multi-stage manner along the second axial line "L2" direction.

The rotation transmission mechanism 10 is structured so that, when the drive wheel 6 is turned to one side "L1CCW" around the first axial line "L1", the drive teeth 66 drive the driven wheel 7 to one side "L2CW" around the second axial line "L2" through the driven teeth 76 and, after that, when engagement of the drive teeth 66 with the driven teeth 76 is released and disconnected, the driven wheel 7 is turned to the other side "L2CCW" around the second axial line "L2" by the urging force of the torsion coil spring 8. In this case, the driven wheel 7 is slid on the cam face forming part 670 provided in the drive wheel 6. Therefore, even in a case that the drive wheel 6 is turned to only one side "L1CCW" around the first axial line "L1", the driven wheel 7 can be turned to one side "L2CW" around the second axial line "L2" and, in addition, the driven wheel 7 can be turned to the other side "L2CCW" around the second axial line "L2".

(Structure of Drive Wheel 6)

The drive wheel 6 is formed with totaled four (4) drive teeth 66 (first drive tooth 661, second drive tooth 662, third drive tooth 663 and fourth drive tooth 664) in a multi-stage shape along the first axial line "L1" direction. The four drive teeth 66 are respectively formed one by one at predetermined positions in the first axial line "L1" direction and, when viewed in the first axial line "L1" direction, the four drive teeth 66 are formed at equal angular intervals (see FIG. 7A and FIG. 7B).

In the four drive teeth 66, the first drive tooth 661 formed on the most one side "L1a" in the first axial line "L1" direction is disposed on the most other side "L1CW" around the first axial line "L1", and the second drive tooth 662, the third drive tooth 663 and the fourth drive tooth 664 are disposed in this order along one side "L1CCW" around the first axial line "L1" with respect to the first drive tooth 661. Therefore, in the four drive teeth 66, the fourth drive tooth 664 formed on the most other side "L1b" in the first axial line "L1" direction is located on the most one side "L1CCW" around the first axial line "L1". In other words, in this embodiment, the four drive teeth 66 are respectively formed so that the drive tooth 66 located on one side "L1a" in the first axial line "L1" direction is located on the other side "L1CW" around the first axial line "L1" with respect to the drive tooth 66 located on the other side "L1b" in the first axial line "L1" direction.

In this embodiment, the drive teeth 66 of the drive wheel 6 drive the driven wheel 7 only when the drive wheel 6 is turned to one side "L1CCW" around the first axial line "L1". Therefore, each of the four drive teeth 66 is, as shown in FIG. 7A and FIG. 7B, formed so that a face on one side "L1CCW" around the first axial line "L1" is provided with a tooth face having an involute curve, and that a face from an end part on an outer side in a radial direction (tooth tip)

of each of the four drive teeth 66 to the other side "L1CW" around the first axial line "L1" is formed to be a circular peripheral face which is continuously extended from the end part on the outer side in the radial direction of each of the four drive teeth 66.

In this embodiment, each of the faces on one side "L1CCW" around the first axial line "L1" of the second drive tooth 662, the third drive tooth 663 and the fourth drive tooth 664 of the four drive teeth 66 is formed to be a tooth face having a simple involute curve. On the other hand, the face of the first drive tooth 661 on one side "L1CCW" around the first axial line "L1" is formed so that a curvature radius of the end part on the outer side in the radial direction is increased with an involute curve as a basis. Therefore, when an operation described below is performed, shifting to a full open position from a position just before a full open state can be performed smoothly. Further, a direction to which a force is applied is not rapidly changed and thus a momentary impact noise or the like can be reduced.

(Structure of Driven Wheel 7)

The driven wheel 7 is formed with totaled four (4) driven teeth 76 (first driven tooth 761, second driven tooth 762, third driven tooth 763 and fourth driven tooth 764) in a multi-stage shape along the second axial line "L2" direction. The four driven teeth 76 (first driven tooth 761, second driven tooth 762, third driven tooth 763 and fourth driven tooth 764) are respectively formed at positions corresponding to the four drive teeth 66 (first drive tooth 661, second drive tooth 662, third drive tooth 663 and fourth drive tooth 664). The four driven teeth 76 are respectively formed one by one at predetermined positions in the second axial line "L2" direction and, when viewed in the second axial line "L2" direction, the four driven teeth 76 are formed at equal angular intervals (see FIG. 7A and FIG. 7B).

In the four driven teeth 76, the first driven tooth 761 formed on the most one side "L2a" in the second axial line "L2" direction is disposed on the most other side "L2CCW" around the second axial line "L2", and the second driven tooth 762, the third driven tooth 763 and the fourth driven tooth 764 are disposed in this order toward one side "L2CW" around the second axial line "L2" from the first driven tooth 761. Therefore, in the four driven teeth 76, the fourth driven tooth 764 formed on the most other side "L2b" in the second axial line "L2" direction is located on the most one side "L2CW" around the second axial line "L2". Accordingly, in the plurality of the driven teeth 76, the driven tooth 76 located on one side "L2a" in the second axial line "L2" direction is located on the other side "L2CCW" around the second axial line "L2" with respect to the driven tooth 76 located on the other side "L2b" in the second axial line "L2" direction.

In this embodiment, the drive teeth 66 are abutted with the driven teeth 76 only from the other side "L2CCW" around the second axial line "L2". Therefore, each of the four driven teeth 76 is formed so that a face on the other side "L2CCW" around the second axial line "L2" is provided with a tooth face having an involute curve, and that a portion from end parts (tooth tip) on an outer side in a radial direction of the four driven teeth 76 to one side "L2CW" around the second axial line "L2" is formed to be a circular peripheral face which is continuously extended from the end parts on the outer side in the radial direction of the four driven teeth 76 (see FIG. 6).

Further, the driven tooth forming part 760 of the driven wheel 7 is provided with a final driven tooth 765 on one side "L2CW" around the second axial line "L2" with respect to the plurality of the driven teeth 76 and on the other side "L2b" in the second axial line "L2" direction with respect to the plurality of the driven teeth 76 so as not to abut with the drive teeth 66 when the drive wheel 6 is turned to one side "L1CCW" around the first axial line "L1".

In this embodiment, respective pitches of the four driven teeth 76 (first driven tooth 761, second driven tooth 762, third driven tooth 763 and fourth driven tooth 764) are equal to each other. On the other hand, a pitch between the fourth driven tooth 764 and the final driven tooth 765 located on the most one side "L2CW" around the second axial line "L2" is wider than the pitch of the four driven teeth 76. For example, the pitch between the fourth driven tooth 764 and the final driven tooth 765 is set in a range from 1.1 times to 1.8 times of the pitch of the plurality of the driven teeth 76. In this embodiment, the pitch between the fourth driven tooth 764 and the final driven tooth 765 is set to 1.25 times of the pitch of the plurality of the driven teeth 76.

(Cam Face Forming Part 670)

The drive wheel 6 is structured with the cam face forming part 670 on a circular peripheral face formed on the other side "L1CW" around the first axial line "L1" with respect to the drive tooth forming part 660. The cam face forming part 670 is disposed with a plurality of cam faces 67 on which the driven teeth 76 are sequentially slid when the driven wheel 7 is turned to the other side "L2CCW" around the second axial line "L2" by the urging force of the torsion coil spring 8 at different positions in the first axial line "L1" direction. The plurality of the cam faces 67 is formed in a multi-stage shape along the first axial line "L1" direction.

The cam face forming part 670 is formed with four cam faces 67 (first cam face 671, second cam face 672, third cam face 673 and fourth cam face 674) so as to correspond to the four driven teeth 76. Further, the cam face forming part 670 is provided with a final cam face 675 with which the final driven tooth 765 of the driven wheel 7 is abutted. Therefore, the cam face forming part 670 is formed with totaled five cam faces 67.

In the five cam faces 67, the first cam face 671 formed on the most one side "L1a" in the first axial line "L1" direction is disposed on the most one side "L1CCW" around the first axial line "L1". The second cam face 672, the third cam face 673, the fourth cam face 674 and the final cam face 675 are disposed in this order along the other side "L1CW" around the first axial line "L1" with respect to the first cam face 671. Therefore, among the five cam faces 67, the final cam face 675 formed on the most other side "L1b" in the first axial line "L1" direction is located on the most other side "L1CW" around the first axial line "L1". Accordingly, in the plurality of the cam faces 67, the cam face 67 located on one side "L1a" in the first axial line "L1" direction is located on one side "L1CCW" around the first axial line "L1" with respect to the cam face 67 located on the other side "L1b" in the first axial line "L1" direction.

Each of the five cam faces 67 is formed of a circular arc face which is extended in a circular arc shape from one side "L1CCW" around the first axial line "L1" to the other side "L1CW" and the driven teeth 76 are slid on parts of the five cam faces 67 in the circumferential direction. Therefore, cam faces adjacent to each other in the circumferential direction of the five cam faces 67 are overlapped with each other over a certain angular range. In this embodiment, the first cam face 671 is extended in a circumferential direction from an end part on an outer side in a radial direction of the first drive tooth 661. Further, in each of the plurality of the cam faces 67, its end part on the most one side "L1CCW" around the first axial line "L1" is located on an outer side in the radial direction with respect to the adjacent cam face 67 on one side "L1CCW" around the first axial line "L1".

A diameter of each of the five cam faces 67 is reduced from one side "L1CCW" toward the other side "L1CW" around the first axial line "L1" and is reached to an outer peripheral face of the first body part 62 which is continuously extended from the tooth bottoms of the drive teeth 66 to the other side "L1CW" around the first axial line "L1". Further, in the final cam face 675, a reducing rate of an outer diameter in a circumferential direction of a portion located on one side "L1CCW" around the first axial line "L1" is smaller than that of other cam faces 67 (first cam face 671, second cam face 672, third cam face 673 and fourth cam face 674). In addition, a reducing rate of an outer diameter in the circumferential direction of a portion of the final cam face 675 located on the other side "L1CW" around the first axial line "L1" is larger than that of other cam faces 67. Further, in the second cam face 672, an end part on the most one side "L1CCW" around the first axial line "L1" is located on an inner side in the radial direction with respect to the cam faces 67 (third cam face 673, fourth cam face 674 and final cam face 675) provided on the other side "L1CW" around the first axial line "L1". Therefore, when an operation described below is to be performed, the third driven tooth 763, the fourth driven tooth 764 and the final driven tooth 765 which are disposed in a latter stage to the second driven tooth 762 are not interfered with a portion extended from the second cam face 672 to the other side "L1b" in the first axial line "L1" direction.

Further, in this embodiment, as described below, it is structured that, in respective regions where the plurality of the driven teeth 76 is sequentially slid on the plurality of the cam faces 67, the subsequent driven tooth 76 or the final driven tooth 765 for the next region is contacted with the cam face 67 while the driven tooth 76 in the current region has been contacted with the cam face.

(Structure of Detector 92 and the Like)

Figure 8:
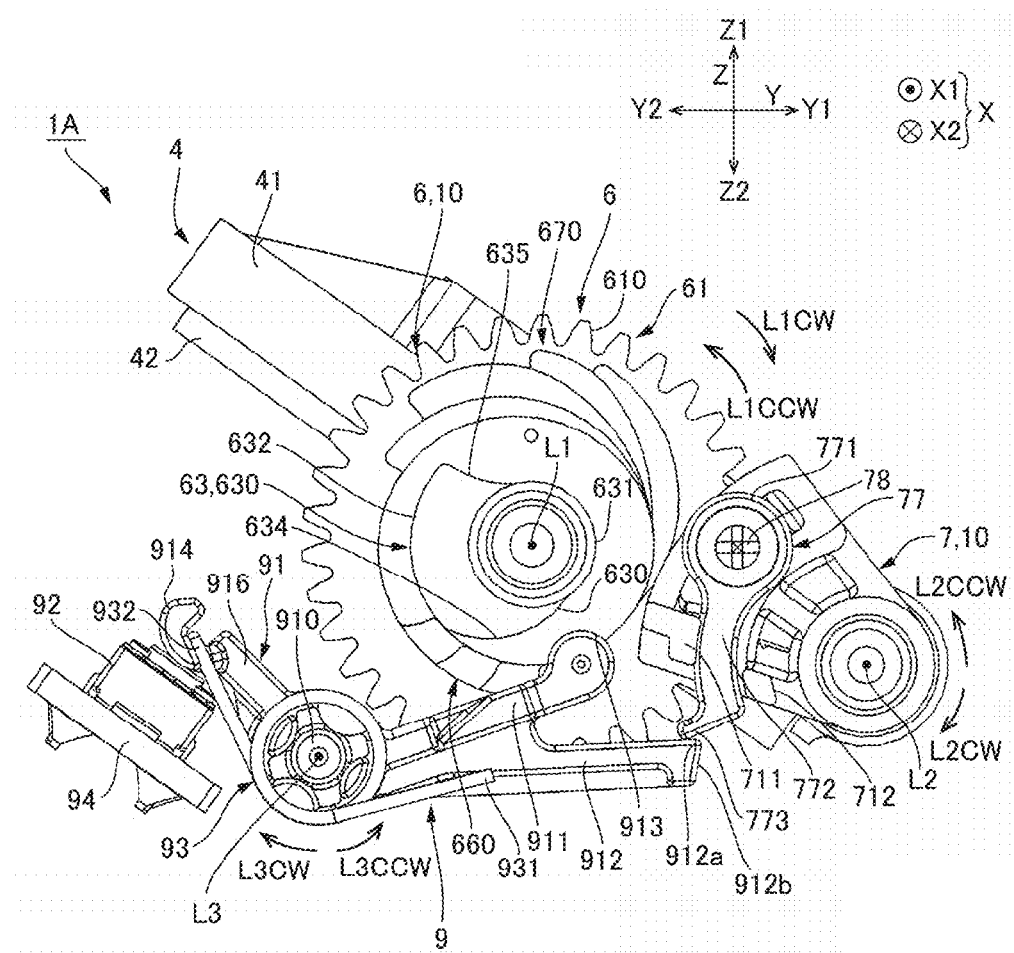
FIG. 8 is an explanatory view showing a detection mechanism structured to monitor an angular position and the like of the drive wheel shown in FIG. 4.

FIG. 8 is an explanatory view showing a detection mechanism 9 structured to monitor an angular position and the like of the drive wheel 6 shown in FIG. 4. As shown in FIG. 4 and FIG. 8, the rotation transmission mechanism 10 in this embodiment includes a detection mechanism 9 structured to monitor an angular position of the drive wheel 6 or the driven wheel 7 (baffle 4). In this embodiment, the detection mechanism 9 is structured to monitor an angular position of the drive wheel 6 by a detector 920.

The detection mechanism 9 includes a transmission member 91 which is displaced by a position detection cam face 630 provided on the second body part 63 of the drive wheel 6 and a detector 92 whose state is switched by displacement of the transmission member 91. The position detection cam face 630 is provided with a small diameter part 631, a diameter enlarging part 634, a large diameter part 632 and a diameter reducing part 635 along the other side "L1CW" around the first axial line "L1".

The detector 92 is, for example, a pushing type switch, which is turned on and off by displacement of the transmission member 91. Another type of switch other than a pushing type switch may be used as the detector 92. For example, a potentiometer may be used which is structured to read a variation such as a displacement amount of the transmission member 91 as variation of voltage. The detector 92 is mounted on a circuit board 94 and a signal outputted from the detector 92 is outputted to a control circuit of the motor 50 and the like through the circuit board 94.

The transmission member 91 is provided with a shaft part 910 turnably supported by a lever holding part (not shown) formed in the cover 3, a first arm part 911 protruded from the shaft part 910 toward the position detection cam face 630 of the drive wheel 6, a second arm part 912 which is extended along the first arm part 911 and is located on an opposite side to the position detection cam face 630 with respect to the first arm part 911, and a third arm part 916 protruded from the shaft part 910 toward the detector 92. The transmission member 91 is turnable around a third axial line "L3" which is an axial line of the shaft part 910. A tip end of the first arm part 911 is provided with a first abutting part 913 in a substantially circular shape which is capable of sliding on the position detection cam face 630, and a tip end of the third arm part 916 is provided with a second abutting part 914 which is capable of abutting with the detector 92.

A torsion coil spring 93 which is an urging member (first urging member) supported by the cover 3 is provided for the transmission member 91. One end part 931 of the torsion coil spring 93 is supported by a spring support wall (not shown) formed in the cover 3, and the other end part 932 of the torsion coil spring 93 is supported by a second abutting part 914 provided with a tip end of the third arm part 916 of the transmission member 91. Therefore, the transmission member 91 is urged to one side "L3CCW" around the third axial line "L3" by the torsion coil spring 93. Accordingly, in a region where the first abutting part 913 provided at the tip end of the first arm part 911 faces the small diameter part 631 of the position detection cam face 630, the second abutting part 914 of the third arm part 916 presses the detector 92. On the other hand, in a region where the first abutting part 913 provided at the tip end of the first arm part 911 is abutted with the large diameter part 632 of the position detection cam face 630, the second abutting part 914 of the third arm part 916 is separated from the detector 92. Therefore, when the on/off of the detector 92 is monitored, an angular position of the drive wheel 6 can be detected and thus, angular positions of the driven wheel 7 and the baffle 4 can be monitored.

(Structure of Abnormality Detection Mechanism)

In the drive device 1A in this embodiment, the detection mechanism 9 is, as described below, structured as an abnormality detection mechanism which detects an abnormality that the driven wheel 7 and the baffle 4 become unable to turn due to a foreign matter when the driven wheel 7 and the baffle 4 are going to turn to the other side "L2CCW" around the second axial line "L2" (to the other side "LCCW" around the center axial line "L") by the urging force of the torsion coil spring 8. Therefore, the drive device 1A is structured as a drive device with an abnormality detection mechanism.

Specifically, the transmission member 91 is formed with the second arm part 912 extended toward the driven wheel 7 and, on the other hand, the driven wheel 7 is structured with an abutting part 773 protruded toward a tip end part 912a of the second arm part 912. A tip end face 912b of the second arm part 912 is formed to be an inclined face. Further, as shown in FIG. 6, the driven wheel 7 is structured so that a tube-shaped base end part 771 of a lever member 77 is held by a main body part 70 of the driven wheel 7, and a tip end part of the lever member 77 is formed to be the abutting part 773. In this embodiment, the main body part 70 of the driven wheel 7 is formed with a cylindrical tube part 713, and the base end part 771 of the lever member 77 is formed with a hole 774 to which the cylindrical tube part 713 is fitted, and a screw 78 is fitted to the hole 774. Therefore, the lever member 77 is turnable with the cylindrical tube part 713 as a center and is prevented from coming out from the cylindrical tube part 713 by a head part of the screw 78. In this embodiment, the main body part 70 of the driven wheel 7 is formed with protruded parts 711 and 712 which are protruded on both sides of the arm part 772 connecting the base end part 771 and the tip end part (abutting part 773) of the lever member 77. Therefore, a turnable range of the lever member 77 with the cylindrical tube part 713 as a center is restricted by the protruded parts 711 and 712.

In the detection mechanism 9 structured as described above, as described below with reference to FIG. 9A through FIG. 11C, when the driven wheel 7 and the baffle 4 are normally turned to the other side "L2CCW" around the second axial line "L2" (to the other side "LCCW" around the center axial line "L") by the urging force of the torsion coil spring 8, the abutting part 773 is abutted with the tip end part 912a of the second arm part 912 of the transmission member 91 to displace the transmission member 91. On the other hand, when the driven wheel 7 and the baffle 4 are unable to be normally turned to the other side "L2CCW" around the second axial line "L2" (to the other side "LCCW" around the center axial line "L") by the urging force of the torsion coil spring 8, the abutting part 773 is not abutted with the tip end part 912a of the second arm part 912 of the transmission member 91. Therefore, the detector 92 outputs different signals at a normal time and an abnormal time.

(Operation of Rotation Transmission Mechanism)

Figure 9A:
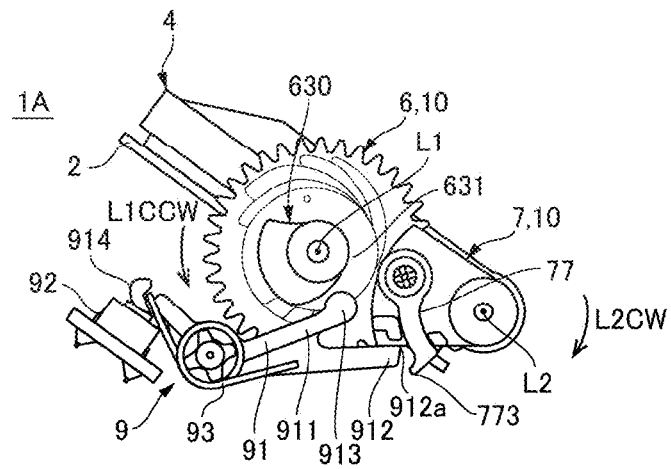
FIG. 9A, FIG. 9B and FIG. 9C are explanatory views respectively showing a state that a baffle is switched from a closing state to an open state in the detection mechanism shown in FIG. 8.
Figure 9B:
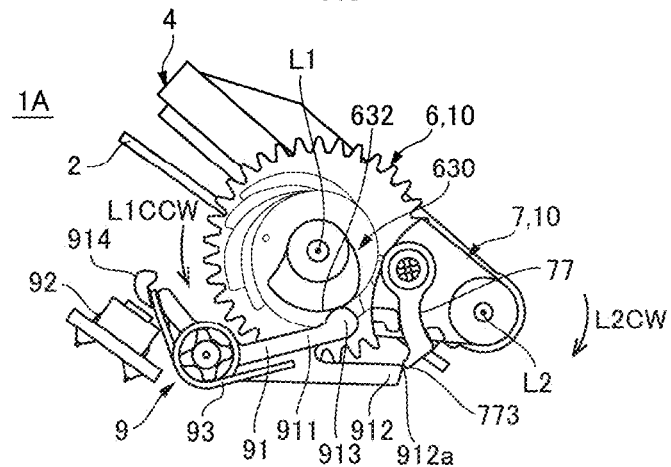
Figure 9C:
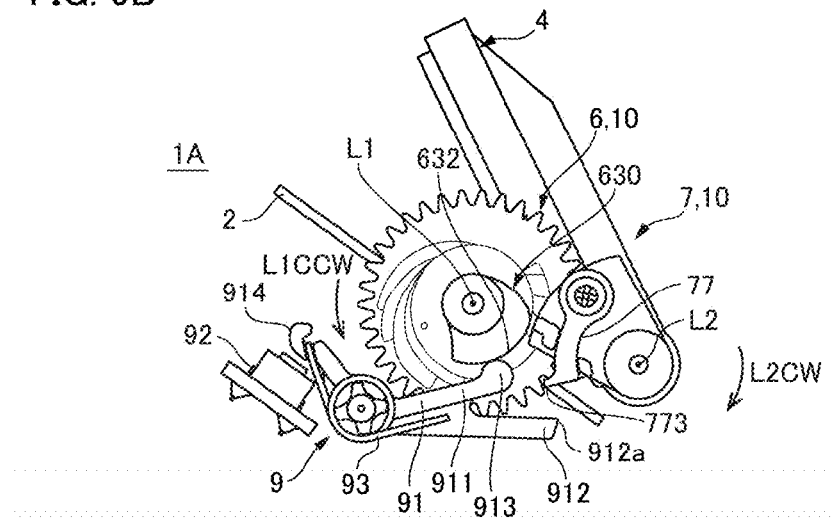
Figures 10A, 10D:
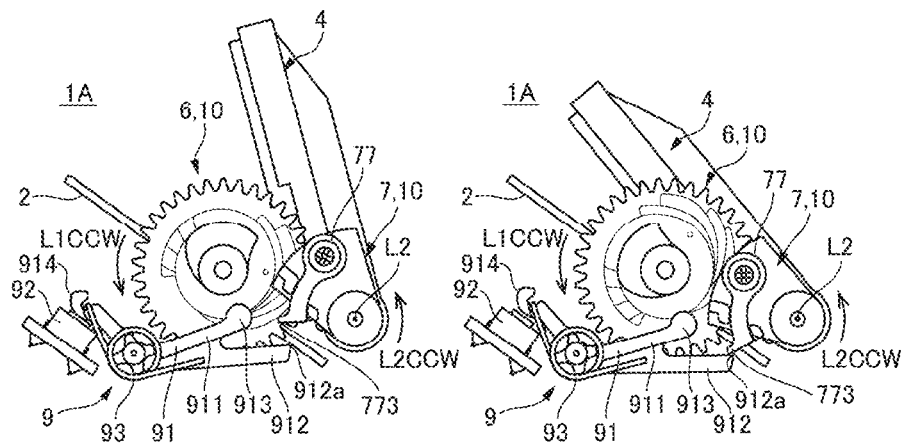
FIG. 10A through FIG. 10F are explanatory views respectively showing a state that a baffle is switched from an open state to a closing state in the detection mechanism shown in FIG. 8.

FIG. 9A, FIG. 9B and FIG. 9C are explanatory views respectively showing a state that the baffle 4 is switched from the closing state to the open state in the detection mechanism 9 shown in FIG. 8. FIG. 10A through FIG. 10F are explanatory views respectively showing a state that the baffle 4 is switched from the open state to the closing state in the detection mechanism 9 shown in FIG. 8. FIG. 11A, FIG. 11B and FIG. 11C are explanatory views respectively showing a feedback signal (FB signal) which is outputted from the detector 92 shown in FIG. 8. FIG. 11A is an explanatory view showing a feedback signal in a normal state, FIG. 11B is an explanatory view showing a feedback signal in a case that an abnormality is occurred when the baffle 4 is turned to the closing posture 4A, and FIG. 11C is an explanatory view showing a feedback signal "FB" in a case that an abnormality is occurred when the baffle 4 is turned to the open posture 4B.

First, as shown in FIG. 9A, when the baffle 4 is located in the closing state (opening degree=0°) (section "t1"), the first abutting part 913 of the first arm part 911 of the transmission member 91 is located at a position facing the small diameter part 631 of the position detection cam face 630 and thus, the second abutting part 914 of the third arm part 916 presses the detector 92. Therefore, a feedback signal "FB" outputted from the detector 92 is an "ON" level (see FIG. 11A). In the section "t1", the abutting part 773 of the driven wheel 7 is located on the other side "Z2" in the "Z" direction with respect to the second arm part 912 of the transmission member 91.

In this state, as shown in FIG. 9B, when a drive force of the motor 50 is transmitted to the drive wheel 6 and the drive wheel 6 is turned to one side "L1CCW" around the first axial line "L1", the fourth drive tooth 664 of the drive wheel 6 is abutted with the fourth driven tooth 764 of the driven wheel 7 and the driven wheel 7 begins to turn to one side "L2CW" around the second axial line. Therefore, the baffle 4 begins to turn in an opening direction (section "t2"). In this case, the first abutting part 913 of the first arm part 911 is contacted with the large diameter part 632 of the position detection cam face 630 and thus the second abutting part 914 of the third arm part 916 is separated from the detector 92. Therefore, the feedback signal "FB" outputted from the detector 92 is turned to an "OFF" level. In this case, the abutting part 773 of the driven wheel 7 is abutted with the tip end part 912a of the second arm part 912 of the transmission member 91. However, a force applied to the transmission member 91 in this case is acted in a direction maintaining a state that the first abutting part 913 of the first arm part 911 is contacted with the large diameter part 632 of the position detection cam face 630 and thus, the feedback signal "FB" is still the "OFF" level (see FIG. 11A).

When the drive wheel 6 is further turned to one side "L1CCW" around the first axial line "L1" as shown in FIG. 9C, the driven wheel 7 is further turned to one side "L2CW" around the second axial line. Therefore, the third drive tooth 663 is abutted with the third driven tooth 763 of the driven wheel 7 and, successively, the second drive tooth 662 is abutted with the second driven tooth 762 of the driven wheel 7 and, in addition, the first drive tooth 661 is abutted with the first driven tooth 761 of the driven wheel 7 and, after that, the driven wheel 7 is turned until a tooth tip of the first drive tooth 661 runs onto a tooth tip of the first driven tooth 761 of the driven wheel 7. As a result, the baffle 4 is set in the open posture 4B (section "t2"). In the meantime, the second abutting part 914 of the third arm part 916 maintains a state separated from the detector 92 and thus the feedback signal "FB" outputted from the detector 92 is a first signal "S1" which is still the "OFF" level (see FIG. 11A). During that time, the abutting part 773 of the driven wheel 7 pushes away the tip end part 912a of the second arm part 912 of the transmission member 91 to one side "Z1" in the "Z" direction, and the abutting part 773 is moved to one side "Z1" in the "Z" direction with respect to the second arm part 912 of the transmission member 91. In this case, at least one of the abutting part 773 and the second arm part 912 of the transmission member 91 is displaced by a reaction force when they are abutted, and the abutting part 773 of the driven wheel 7 can be passed through to one side "Z1" in the "Z" direction with respect to the second arm part 912 of the transmission member 91. In this embodiment, when the abutting part 773 is abutted with the second arm part 912 of the transmission member 91, the arm part 772 of the lever member 77 is resiliently bent and thus the abutting part 773 of the driven wheel 7 can be passed through to one side "Z1" in the "Z" direction with respect to the second arm part 912 of the transmission member 91.

Next, when the drive wheel 6 is further turned to one side "L1CCW" around the first axial line "L1", engagement of the first drive tooth 661 of the drive wheel 6 with the first driven tooth 761 of the driven wheel 7 is released and thus, the driven wheel 7 is going to turn to the other side "L2CCW" around the second axial line "L2" by the urging force of the torsion coil spring 8. However, the first driven tooth 761 is abutted with the first cam face 671 and thus, the driven wheel 7 is prevented from turning to the other side "L2CCW" around the second axial line "L2" and a state that the driven wheel 7 is stopped at the most one side "L2CW" around the second axial line "L2" is maintained (section "t3"). Therefore, as shown in FIG. 10A, the baffle 4 is also still stopped at the open posture 4B and the first driven tooth 761 slides on the first cam face 671.

FIG. 7B shows a halfway state that the first driven tooth 761 slides on the first cam face 671. The driven wheel 7 and the baffle 4 are still stopped in the open posture 4B until the first driven tooth 761 reaches a portion of the first cam face 671 where a diameter of the first cam face 671 is reduced on the other side "L1CW" around the first axial line "L1". When the first abutting part 913 of the transmission member 91 is moved from the large diameter part 632 of the position detection cam face 630 to the small diameter part 631 through the diameter reducing part 635, the second abutting part 914 of the third arm part 916 presses the detector 92 and thus, the feedback signal "FB" in the detector 92 is turned to the "ON" level (see FIG. 11A). FIG. 7B shows a halfway state that the first abutting part 913 of the transmission member 91 is going to be moved to the small diameter part 631 of the position detection cam face 630.

Figures 10B, 10E:
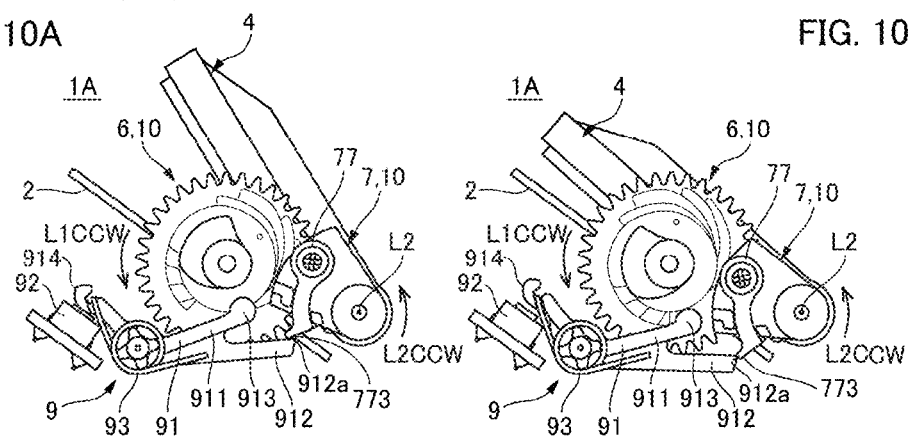
Figure 11A:
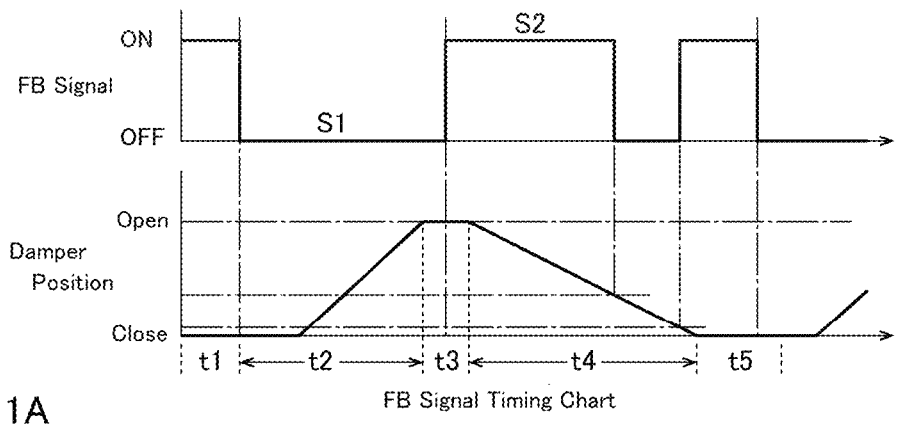
FIG. 11A, FIG. 11B and FIG. 11C are explanatory views respectively showing a feedback signal (FB signal) which is outputted from a detector shown in FIG. 8.
Figure 11B:
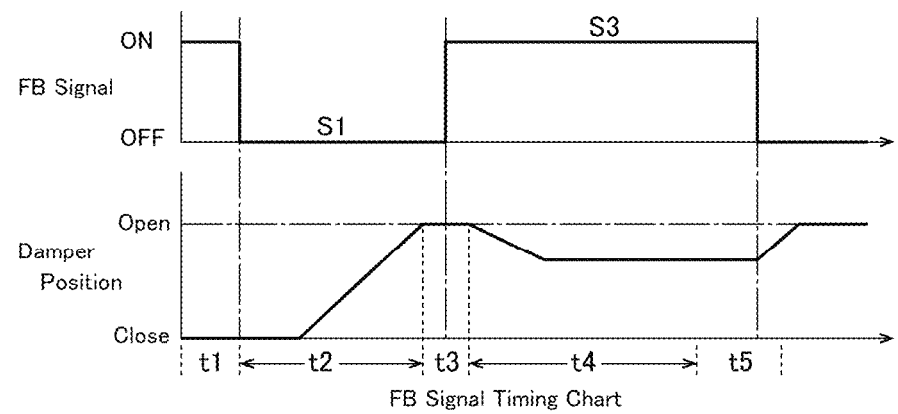
Figure 11C:
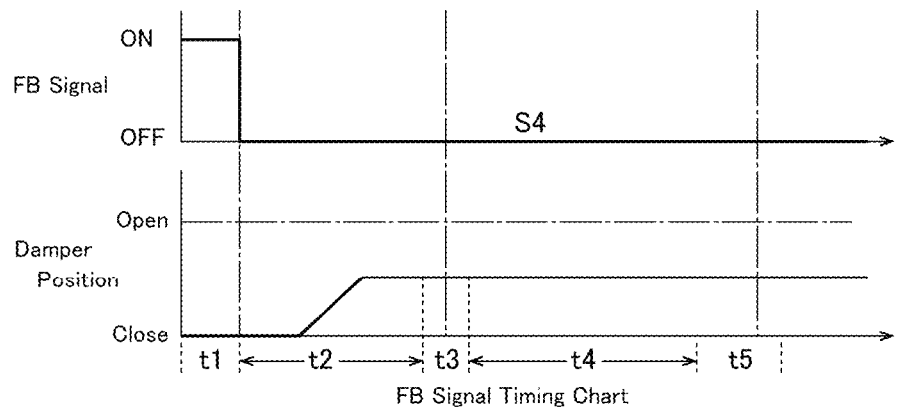

When the first driven tooth 761 reaches a portion of the first cam face 671 where the diameter of the first cam face 671 is reduced on the other side "L1CW" around the first axial line "L1", as shown in FIG. 10B, the driven wheel 7 begins to turn to the other side "L2CCW" around the second axial line "L2" by the urging force of the torsion coil spring 8. Therefore, the baffle 4 begins to turn to the other side "LCCW" (closing direction) around the turning center axial line "L" (section "t4").

When the drive wheel 6 is further turned to one side "L1CCW" around the first axial line "L1", the second driven tooth 762 is contacted with the second cam face 672 in a state that the first driven tooth 761 is contacted with the first cam face 671. After that, the second driven tooth 762 slides on the second cam face 672. Successively, the first driven tooth 761 is separated from the first cam face 671, and the third driven tooth 763 is contacted with the third cam face 673 in a state that the second driven tooth 762 is contacted with the second cam face 672, and the third driven tooth 763 slides on the third cam face 673. Next, the second driven tooth 762 is separated from the second cam face 672, and the fourth driven tooth 764 is contacted with the fourth cam face 674 in a state that the third driven tooth 763 is contacted with the third cam face 673, and the fourth driven tooth 764 slides on the fourth cam face 674. In addition, the third driven tooth 763 is separated from the third cam face 673, and the final driven tooth 765 is contacted with the final cam face 675 in a state that the fourth driven tooth 764 is contacted with the fourth cam face 674, and the final driven tooth 765 slides on the final cam face 675.

The driven wheel 7 is turned to the other side "L2CCW" around the second axial line "L2" by the urging force of the torsion coil spring 8 until the final driven tooth 765 is passed through the final cam face 675, and then the driven wheel 7 is stopped (section "t4"). Therefore, the baffle 4 is stopped in a state of the closing posture 4A. During that time, even when the drive wheel 6 is further turned to one side "L1CCW" around the first axial line "L1", the driven wheel 7 and the baffle 4 are stopped until the fourth drive tooth 664 is abutted with the fourth driven tooth 764 (section "t5"). Further, in the middle of the stopped section, the first abutting part 913 of the transmission member 91 used for the detector 92 is moved from the small diameter part 631 of the position detection cam face 630 to the large diameter part 632 through the diameter enlarging part 634. Therefore, the feedback signal "FB" is switched to the "OFF" level (see FIG. 11A).

Figures 10C, 10F:
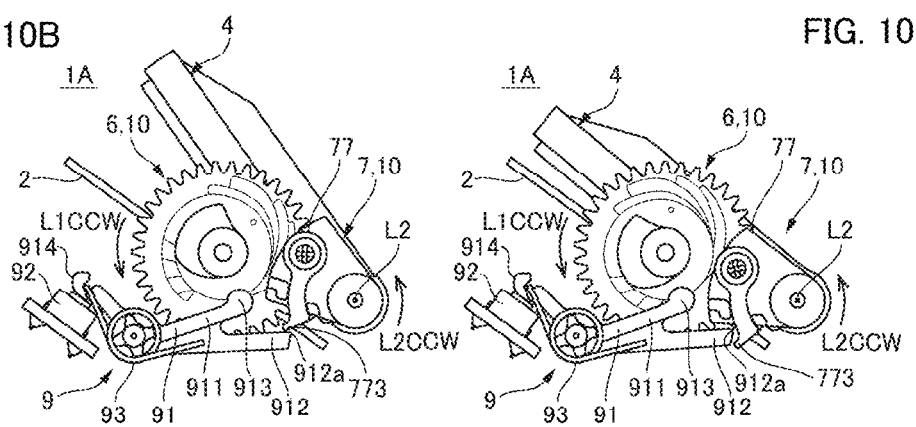

In the meantime, when the driven wheel 7 is moved to the other side "L2CCW" around the second axial line "L2", as shown in FIG. 10C, the abutting part 773 is abutted with the second arm part 912 of the transmission member 91 from one side "Z1" in the "Z" direction and then, as shown in FIG. 10D and FIG. 10E, the abutting part 773 pushes away the tip end part 912a of the second arm part 912 of the transmission member 91 to the other side "Z2" in the "Z" direction, and the abutting part 773 is moved to the other side "Z2" in the "Z" direction with respect to the second arm part 912 of the transmission member 91 as shown in FIG. 10F. In this case, the abutting part 773 of the driven wheel 7 turns the second arm part 912 to the other side "L3CW" around the third axial line "L3" and thus the abutting part 773 of the driven wheel 7 can be passed through to the other side "Z2" in the "Z" direction with respect to the second arm part 912 of the transmission member 91.

Further, as shown in FIG. 10D and FIG. 10E, in a case that the abutting part 773 pushes away the tip end part 912a of the second arm part 912 of the transmission member 91 to the other side "Z2" in the "Z" direction, the first abutting part 913 of the first arm part 911 is located at a position facing the small diameter part 631 of the position detection cam face 630 and thus the transmission member 91 is turned to the other side "L3CW" around the third axial line "L3". Therefore, the second abutting part 914 of the third arm part 916 is separated from the detector 92 and thus, the feedback signal "FB" turns to the "OFF" level (see FIG. 11A). Further, when the abutting part 773 is passed through to the other side "Z2" in the "Z" direction with respect to the second arm part 912 of the transmission member 91 as shown in FIG. 10F, the first abutting part 913 of the first arm part 911 is not contacted with the large diameter part 632 of the position detection cam face 630 and thus, the transmission member 91 is turned to one side "L3CCW" around the third axial line "L3" by the urging force of the torsion coil spring 93 which urges the transmission member 91 to one side "L3CCW" around the third axial line "L3". Therefore, the second abutting part 914 of the third arm part 916 presses the detector 92 and thus, the feedback signal "FB" is turned to the "ON" level (see FIG. 11A).

Accordingly, in the section "t4", in a case that, after the feedback signal "FB" is switched from the "ON" level to the "OFF" level and then returned to the "ON" level, in other words, in the case of the second signal "S2", it can be detected that the driven wheel 7 and the baffle 4 are turned to the other side "L2CCW" around the second axial line "L2" until the baffle 4 is set in the closing posture 4A.

After that, when the drive wheel 6 is further turned to one side "L1CCW" around the first axial line "L1", the above-mentioned operation is repeated.

(Abnormality of Closing Operation)

Figure 12:
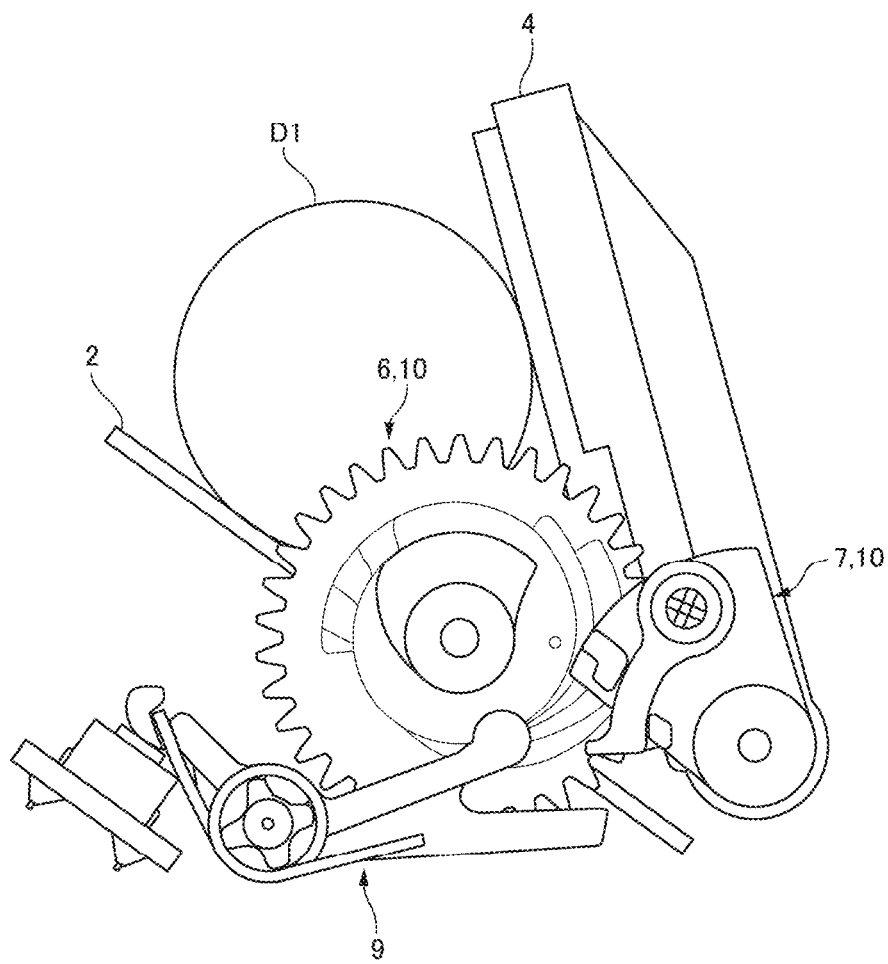
FIG. 12 is an explanatory view showing a state that an abnormality is occurred when the baffle shown in FIG. 8 is turned toward a closing posture.

FIG. 12 is an explanatory view showing a state that an abnormality is occurred when the baffle 4 shown in FIG. 8 is turned toward the closing posture 4A. When the closing operation described with reference to FIG. 10A through FIG. 10F is to be performed, it is assumed that a foreign matter "D1" is caught between the baffle 4 and the frame 2 as shown in FIG. 12. In this case, the baffle 4 and the driven wheel 7 are unable to be turned to the other side "L2CCW" around the second axial line "L2" and thus, the abutting part 773 of the driven wheel 7 is unable to push away the tip end part 912a of the second arm part 912 of the transmission member 91 to the other side "Z2" in the "Z" direction as shown in FIG. 10D and FIG. 10E. Therefore, the second abutting part 914 of the third arm part 916 is left in a pressed state against the detector 92 and thus, as shown in FIG. 11B, the feedback signal "FB" becomes a third signal "S3" which remains the "ON" level. Therefore, it can be detected that an abnormality has been occurred in the closing operation.

(Abnormality of Opening Operation)

Figure 13:
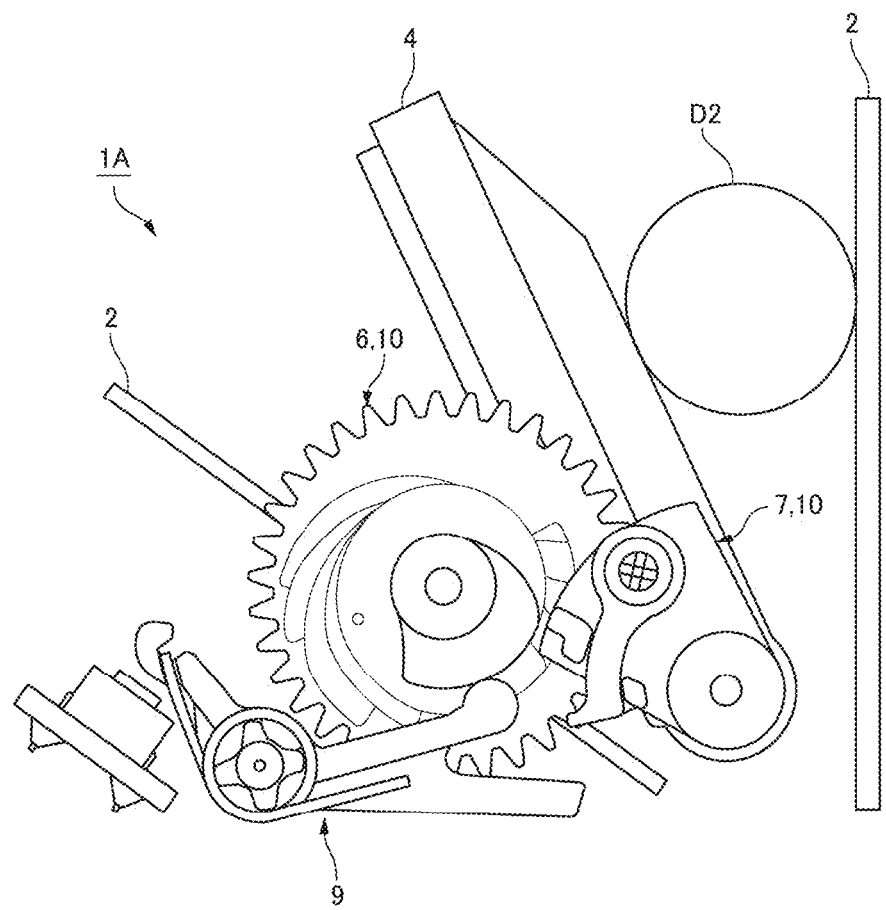
FIG. 13 is an explanatory view showing a state that an abnormality is occurred when the baffle shown in FIG. 8 is turned toward an open posture.

FIG. 13 is an explanatory view showing a state that an abnormality is occurred when the baffle 4 shown in FIG. 8 is turned toward the open posture 4B. In a case that an opening operation described with reference to FIG. 9A through FIG. 9C is to be performed, when an abnormality is occurred that a foreign matter "D2" is caught between the baffle 4 and the frame 2 as shown in FIG. 13 and that the baffle 4 and the driven wheel 7 are unable to turn to one side "L2CW" around the second axial line "L2", the feedback signal "FB" becomes a forth signal S4 which remains the "OFF" level (see FIG. 11C) even when the first abutting part 913 of the transmission member 91 becomes a state that the first abutting part 913 faces the small diameter part 631 of the position detection cam face 630 after the second abutting part 914 of the third arm part 916 is separated from the detector 92 as shown in FIG. 9B and FIG. 9C. Therefore, it can be detected that an abnormality has been occurred in the opening operation.

Principal Effects in this Embodiment

As described above, in this embodiment, in a case that the driven wheel 7 is turned to the other side "L2CCW" around the second axial line "L2" in a state that transmission of power of the drive wheel 6 is disconnected, when an abnormality that the driven wheel 7 is unable to be turned is occurred, the detector 92 outputs a signal different from a normal state and thus it can be detected that the driven wheel 7 is unable to be turned.

Further, the detector 92 outputs the first signal "S1" (see FIG. 11A) corresponding to an angular position of the drive wheel 6 when the drive wheel 6 drives the driven wheel 7 to one side "L2CW" around the second axial line "L2", the detector 92 outputs the second signal "S2" (see FIG. 11A) corresponding to an angular position of the drive wheel 6 when the driven wheel 7 is normally turned to the other side "L2CCW" around the second axial line "L2", and the detector 92 outputs the third signal "S3" (see FIG. 11B) at the time of an abnormality. Therefore, detection of an angular position of the drive wheel 6 and detection of an abnormality can be performed by the common detector 92.

(Modified Example of Abutting Part for Abnormality Detection)

Figure 14:
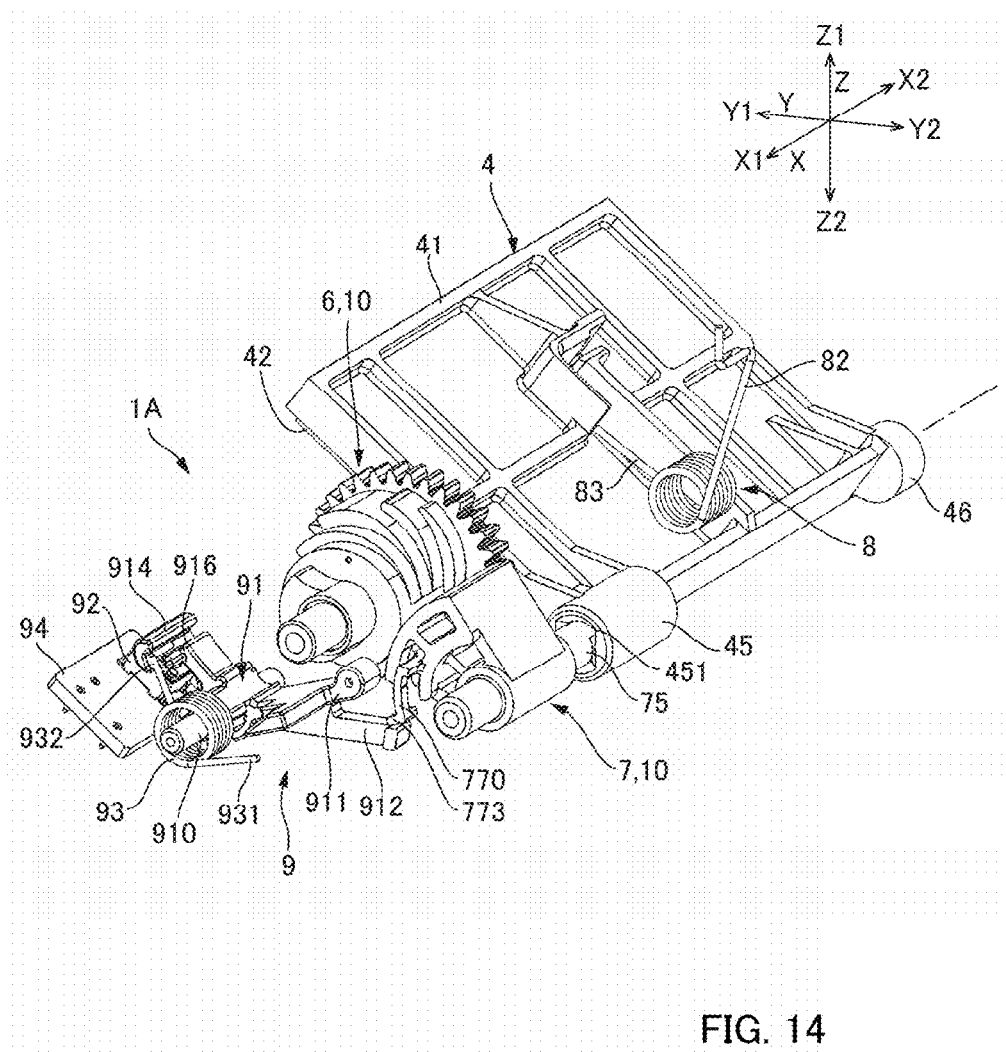
FIG. 14 is a perspective view showing a modified example of a detection mechanism which is used in a drive device in accordance with at least an embodiment of the present invention.
Figure 15:
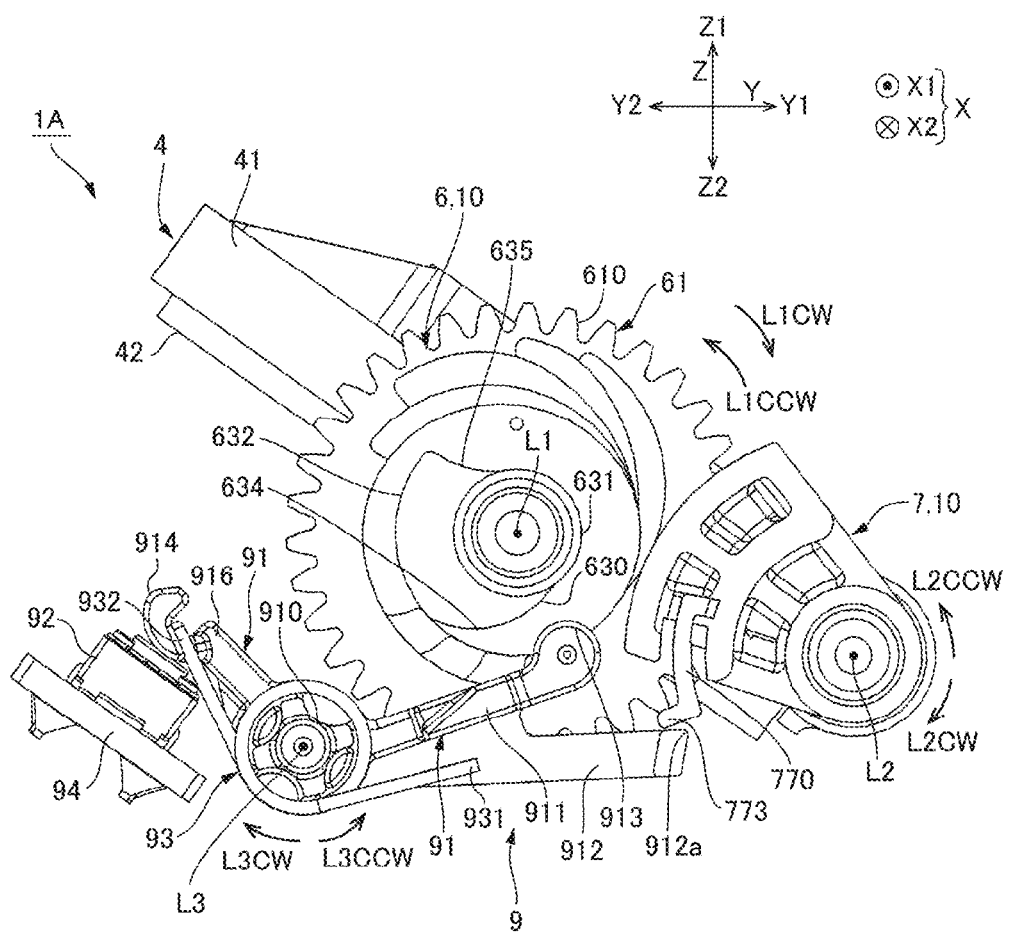
FIG. 15 is a plan view showing a detection mechanism in FIG. 14.

FIG. 14 is a perspective view showing a modified example of the detection mechanism 9 which is used in the drive device 1A in accordance with at least an embodiment of the present invention. FIG. 15 is a plan view showing the detection mechanism 9 in FIG. 14. In the detection mechanism 9 described with reference to FIG. 4 and FIG. 8, in order to provide the abutting part 773 in the driven wheel 7, the lever member 77 is separately provided from the main body part 70 of the driven wheel 7. However, as shown in FIG. 14 and FIG. 15, it may be structured that a tip end part of a lever part 770 integrally formed with the driven wheel 7 is used as an abutting part 773. In this case, when the lever part 770 is abutted with the transmission member 91, the lever part 770 is capable of being resiliently bent and displaced by the reaction force.

OTHER EMBODIMENTS

In the embodiment described above, the torsion coil spring 93 is used as the first urging member which urges the transmission member 91. However, other urging members may be used. Further, in the embodiment described above, the torsion coil spring 8 is used as the second urging member which urges the baffle 4. However, other urging members may be used. For example, a flat spring may be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A drive device with an abnormality detection mechanism comprising:
    a drive source;
    a drive member to which power of the drive source is transmitted;
    a driven member operably coupled to the drive member and structured such that:
        in response to the drive member being turned in a first direction around a first axial line, the driven member is turned in a first direction around a second axial line; and
        in response to transmission of the power from the drive member being disconnected, the driven member is turned in a second direction around the second axial line, and
    a detector structured to output a signal in response to the driven member being turned in the second direction around the second axial line, wherein a signal outputted in a normal state that the driven member is normally turned is different from a signal outputted in an abnormal state that turning of the driven member is prevented;
    wherein the detector outputs a first signal corresponding to an angular position of the drive member in response to the drive member driving the driven member in the first direction around the second axial line,
    the detector outputs a second signal corresponding to an angular position of the drive member in the normal state,
    the detector outputs a third signal in the abnormal state,
    the first signal, the second signal and the third signal are respectively different from each other,
    the drive device further comprises a transmission member which is turnable around a third axial line in cooperation with turning of the drive member around the first axial line,
    the detector outputs the first signal, the second signal and the third signal corresponding to a position of the transmission member,
    the drive member comprises a position detection cam face structured to turn the transmission member around the third axial line,
    the transmission member is urged in a direction coming close to the detector by a first urging member,
    the driven member comprises an abutting part structured to contact with the transmission member in the normal state and displace the transmission member,
    the transmission member comprises a first arm part structured to contact with the position detection cam face and a second arm part structured to abut with the abutting part in the normal state,
    the driven member is structured to temporarily displace the transmission member in a middle of turning of the driven member in the second direction around the second axial line in the normal state and thereby the detector outputs a signal temporarily changing an output of the detector as the second signal, and in the abnormal state, the transmission member is not displaced and thus a signal in which the output of the detector is not changed is outputted from the detector as the third signal.

2. The drive device with an abnormality detection mechanism according to claim 1, wherein the abutting part is structured such that, in the normal state, the abutting part temporarily pushes away the transmission member in a second direction around the third axial line and then the abutting part is turned in the second direction around the second axial line.

3. The drive device with an abnormality detection mechanism according to claim 2, wherein at least one of the abutting part and the transmission member is displaced by a reaction force in response to the transmission member and the abutting part being abutted with each other.

4. The drive device with an abnormality detection mechanism according to claim 1, wherein the abutting part is structured separately from a main body part of the driven member and is held by the main body part.

5. The drive device with an abnormality detection mechanism according to claim 1, wherein the abutting part is integrally structured in the driven member.

6. The drive device with an abnormality detection mechanism according to claim 1, wherein the detector is a pushing type switch.

7. A drive device with an abnormality detection mechanism comprising:
  a drive source;
  a drive member to which power of the drive source is transmitted;
  a driven member operably coupled to the drive member and structured such that:
    in response to the drive member being turned in a first direction around a first axial line, the driven member is turned in a first direction around a second axial line; and
    in response to transmission of the power from the drive member being disconnected, the driven member is turned in a second direction around the second axial line, and
  a detector structured to output a signal in response to the driven member being turned in the second direction around the second axial line, wherein a signal outputted in a normal state that the driven member is normally turned is different from a signal outputted in an abnormal state that turning of the driven member is prevented,
  wherein the detector outputs a first signal corresponding to an angular position of the drive member in response to the drive member driving the driven member in the first direction around the second axial line,
  the detector outputs a second signal corresponding to an angular position of the drive member in the normal state,
  the detector outputs a third signal in the abnormal state,
  the first signal, the second signal and the third signal are respectively different from each other,
  the drive device further comprises a transmission member which is turnable around a third axial line in cooperation with turning of the drive member around the first axial line,
  the detector outputs the first signal, the second signal and the third signal corresponding to a position of the transmission member, the drive member comprises a position detection cam face structured to turn the transmission member around the third axial line,
  the transmission member is urged in a direction coming close to the detector by a first urging member,
  the driven member comprises an abutting part structured to contact with the transmission member in the normal state and displace the transmission member, and
  the transmission member comprises a first arm part structured to contact with the position detection cam face and a second arm part structured to abut with the abutting part in the normal state, and
  the drive device further includes a second urging member structured to urge the driven member in the second direction around the second axial line when the driven member is turned in the second direction around the second axial line.

8. The drive device with an abnormality detection mechanism according to claim 1, wherein the drive source is a motor structured to rotate the drive member in only the first direction around the first axial line.

9. A damper device comprising:
  a drive device with an abnormality detection mechanism comprising:
    a drive source;
    a drive member to which power of the drive source is transmitted;
    a driven member operably coupled to the drive member and structured such that:
      in response to the drive member being turned in a first direction around a first axial line, the driven member is turned in a first direction around a second axial line; and
      in response to transmission of the power from the drive member being disconnected, the driven member is turned in a second direction around the second axial line, and
    a detector structured to output a signal in response to the driven member being turned in the second direction around the second axial line, wherein a signal outputted in a normal state that the driven member is normally turned is different from a signal outputted in an abnormal state that turning of the driven member is prevented a baffle which is turnable around the second axial line together with the driven member; and
  a frame comprising an opening part which is opened and closed by the baffle;
  wherein
  the detector outputs a first signal corresponding to an angular position of the drive member in response to the drive member driving the driven member in the first direction around the second axial line,
  the detector outputs a second signal corresponding to an angular position of the drive member in the normal state,
  the detector outputs a third signal in the abnormal state,
  the first signal, the second signal and the third signal are respectively different from each other
  the drive device further comprises a transmission member which is turnable around a third axial line in cooperation with turning of the drive member around the first axial line,
  the detector outputs the first signal, the second signal and the third signal corresponding to a position of the transmission member, the drive member comprises a position detection cam face structured to turn the transmission member around the third axial line, the transmission member is urged in a direction coming close to the detector by a first urging member, the driven member comprises an abutting part structured to contact with the transmission member in the normal state and displace the transmission member, and the transmission member comprises a first arm part structured to contact with the position detection cam face and a second arm part structured to abut with the abutting part in the normal state, the driven member is structured to temporarily displace the transmission member in a middle of turning of the driven member in the second direction around the second axial line in the normal state and thereby the detector outputs a signal temporarily changing an output of the detector as the second signal, and in the abnormal state, the transmission member is not displaced and thus a signal in which the output of the detector is not changed is outputted from the detector as the third signal.

10. The damper device according to claim 9, wherein the abnormal state is occurred due to that, when the opening part is to be closed by the baffle, a foreign matter is caught between the baffle and the frame and thereby turnings of the baffle and the driven member are prevented.

11. The damper device according to claim 9, wherein the drive device further includes a second urging member that urges the other side around the second axis.

* * * * *